(12) United States Patent
Xu et al.

(10) Patent No.: US 11,636,377 B1
(45) Date of Patent: Apr. 25, 2023

(54) ARTIFICIAL INTELLIGENCE SYSTEM INCORPORATING AUTOMATIC MODEL UPDATES BASED ON CHANGE POINT DETECTION USING TIME SERIES DECOMPOSING AND CLUSTERING

(71) Applicant: Amazon Technologies, Inc., Seattle, WA (US)

(72) Inventors: Qiuping Xu, Seattle, WA (US); Joshua Allen Edgerton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 887 days.

(21) Appl. No.: 16/027,122

(22) Filed: Jul. 3, 2018

(51) Int. Cl.
*G06N 7/00* (2006.01)
*G06N 20/00* (2019.01)

(52) U.S. Cl.
CPC ............. *G06N 20/00* (2019.01); *G06N 7/005* (2013.01)

(58) Field of Classification Search
CPC ............................... G06N 20/00; G06N 7/005
USPC .......................................................... 706/12
See application file for complete search history.

(56) References Cited

U.S. PATENT DOCUMENTS

| | | | |
|---|---|---|---|
| 7,836,111 B1 | 11/2010 | Shan | |
| 8,645,304 B2 * | 2/2014 | Jiang | G06N 7/005 706/47 |
| 2013/0110753 A1 * | 5/2013 | Hao | G06N 5/02 706/46 |

FOREIGN PATENT DOCUMENTS

| | | |
|---|---|---|
| JP | H07168806 A | 7/1995 |
| KR | 101061094 B1 | 8/2011 |
| KR | 20140016559 A * | 2/2014 |

OTHER PUBLICATIONS

Ristanoski et al., Time Series Forecasting using Distribution Enhanced Linear Regression, PAKDD 2013: Advances in Knowledge Discovery and Data Mining, pp. 484-495 (Year: 2013).*
Koshijima et al., Change-Point Detection in a Sequence of Bags-of-Data, IEEE Transactions on Knowledge and Data Engineering, 2015 (Year: 2015).*
Yamada et al., Change-Point Detection with Feature Selection in High-Dimensional Time-Series Data, Proceedings of the Twenty-Third International Joint Conference on Artificial Intelligence, 2016 (Year: 2016).*
Bulunga, Change-point detection in dynamical systems using auto-associative neural networks, thesis, 2012 (Year: 2012).*

(Continued)

*Primary Examiner* — Lut Wong
(74) *Attorney, Agent, or Firm* — Robert C. Kowert; Kowert, Hood, Munyon, Rankin & Goetzel, P.C.

(57) ABSTRACT

Computer systems and associated methods are disclosed to detect a future change point in time series data used as input to a machine learning model. A forecast for the time series data is generated. In some embodiments, a fitting model is generated from the time series data, and residuals of the fitting model are obtained for respective portions of the data both before and after a potential change point in the future. The change point is determined based on a ratio of residual metrics for the two portions. In some embodiments, data features are extracted from individual segments in the time series data, and the segments are clustered based on their data features. A change point is determined based on a dissimilarity in cluster assignments for segments before and after the point. In some embodiments, when a change point is predicted, an update of the machine learning model is triggered.

20 Claims, 12 Drawing Sheets

(56) References Cited

OTHER PUBLICATIONS

Alippi et al (Detecting and Reacting to Changes in Sensing Units: The Active Classifier Case, 2013) (Year: 2013).*
Oh et al ("An Intelligent Clustering Forecasting System based on Change-Point Detection and Artificial Neural Networks: Application to Financial Economics" 2001, from IDS dated Apr. 15, 2021) (Year: 2001).*
Guo et al (Robust Online Time Series Prediction with Recurrent Neural Networks, 2016) (Year: 2016).*
J. Hosang et al "How good are detection proposals, really?" Jul. 22, 2014, pp. 1-25.
Rob J Hyndman et al "Large-Scale Unusual Time Series Detection" pp. 1-4.
Stuart P. Lloyd "Least Squares Quantization in PCM" IEEE Transactions on Information Theory, vol. IT-28, No. 2, Mar. 1982, pp. 1-9.
U.S. Appl. No. 16/027,120, filed Jul. 3, 2018, Quiping Xu, et al.
Oh et al. "An Intelligent clustering forecasting system base on Change-point Detection and Artificial Neural Networks: Application to Financial Economics", Proceeding of the 34th Hawaii International Conference on System Sciences 2001 (Year: 2001), pp. 1-8.
Aminikhanghahi, et al. Real-time Change point Detection with application to Smart home Time series data, IEEE Transactions on Knowledge and Data Engineering, vol. 31, No. 5, May 2019 (Year: 2018), pp. 1010-1023.
Oh et al. "Using Change-point detection to support artificial neural networks for interest rates forecasting", Expert Systems with Applications 19, 2000 (Year: 2000), pp. 1-11.
Jose A. Guajardo, et a., "A Model Updating Strategy for Predicting Time Series with Seasonal Patterns," Applies Soft computing 10 (2010), pp. 276-283.

* cited by examiner

CHANGE POINT DETECTION CONFIGURATION 800

SELECT CHANGE POINT DETECTION METHODS:

- ☒ RESIDUALS FROM FITTING MODEL     WEIGHT: 0.75
- ☒ CLUSTERING OF TIME SEGMENTS     WEIGHT: 0.25
- ☐ VOLATILITY     WEIGHT: 0.00

[ ADD METHOD 810 ]

MODEL UPDATE CONFIGURATION 830

SELECT ACTION UPON CHANGE POINT DETECTION

- ☒ NOTIFY CLIENT     [ CONFIGURE 840 ]
- ☒ TRAIN MODEL WITH AUGMENTED DATA     [ CONFIGURE 850 ]
- ☒ CHANGE MODEL PARAMETERS     [ CONFIGURE 860 ]
- ☐ SWITCH TO DIFFERENT MODEL     [ CONFIGURE 870 ]

ARTIFICIAL INTELLIGENCE SYSTEM INCORPORATING AUTOMATIC MODEL UPDATES BASED ON CHANGE POINT DETECTION USING TIME SERIES DECOMPOSING AND CLUSTERING

BACKGROUND

Time series analysis has become increasingly important in diverse areas including finance, supply chain, and business. Time series data are sequences of measurements indexed by time describing the behavior of systems. These behaviors can change over time due to external events and/or internal systematic changes. The ability to analyze large volumes of time series data and quickly respond to changes in such data has become increasingly important in many modern computing systems.

Change points are abrupt variations of one or more characteristics in the time series data. In many instances, such changes may indicate transitions between different behavior states in the system. For example, change points in human eye movement data as measured by eye movement sensors may indicate transitions between different stages of the sleep cycle. Fast and accurate detection of such changes is critical for planning and optimal resource allocation. However, the construction of a robust real time change point detection system remains a difficult challenge, and as a result, computing systems that perform such detection are not utilized efficiently. Sophisticated change point detection models require large amounts of time and effort to develop and properly tune. Moreover, such models are often built as part of a domain-specific data analysis system, so that they are not easily usable or configurable for different data or to trigger different programmatic actions.

BRIEF DESCRIPTION OF THE DRAWINGS

FIGS. 8A and 8B illustrate example user interfaces to configure different aspects of a change point detection system to trigger model updates, according to some embodiments.

Figure 1:
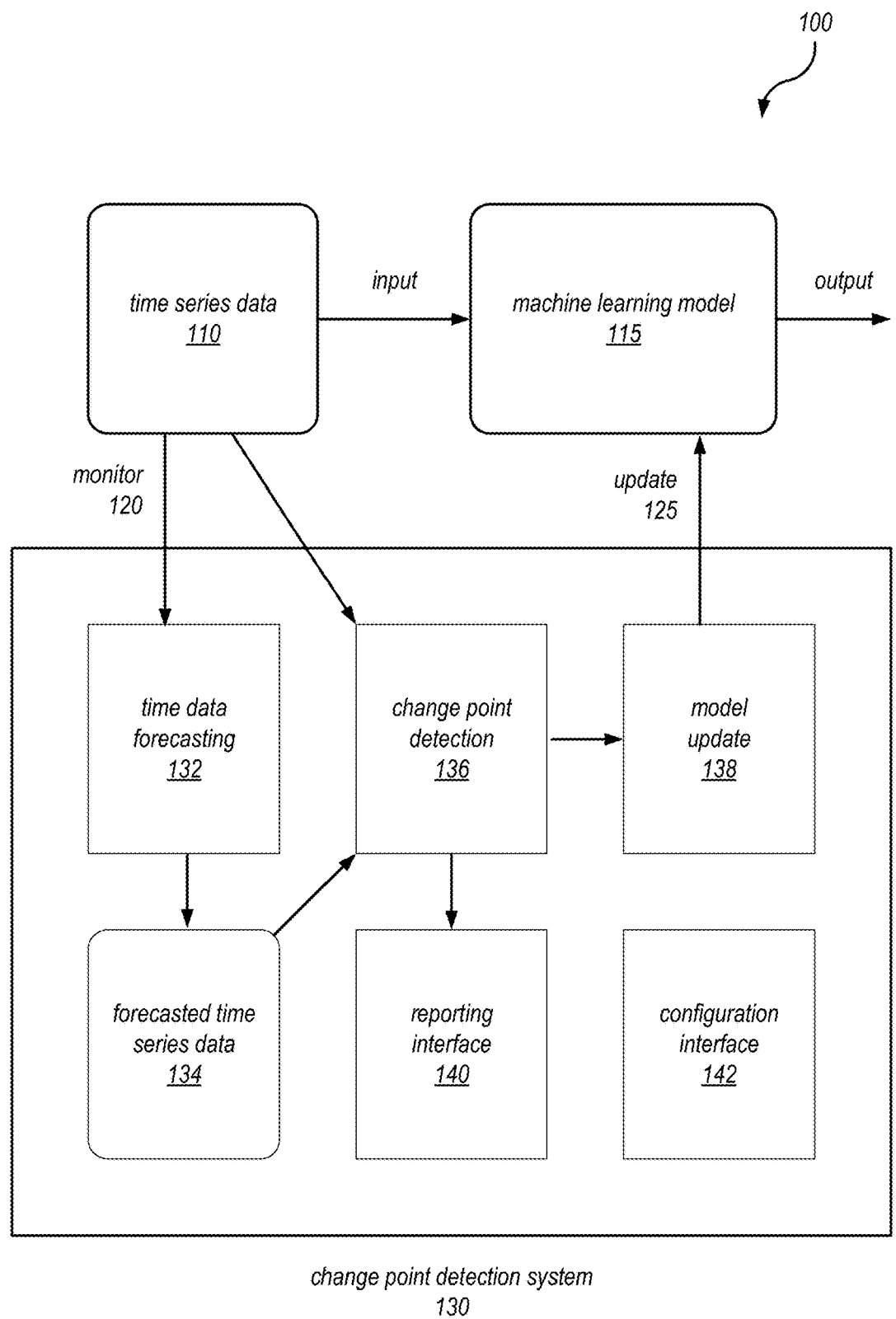
FIG. 1 is a block diagram illustrating an example change point detection system that is used to update a time-based model, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement a change point detection system that predicts a change point in input time series data to a model and then updates the model accordingly.

Change points are abrupt variations one or more characteristics or properties in the time series data. In many instances, such changes may indicate transitions between different states in the data. Fast and accurate detection of change points is useful in numerous applications from prediction modeling to performance monitoring. However, the construction of a robust and versatile change point detection system remains a difficult challenge. Sophisticated change point detection models require large amounts of time and effort to develop and properly tune. Moreover, such models are often built as part of a domain-specific data analysis system, so that they are not easily reusable or configurable for different data or to trigger different programmatic actions.

In some instances, time series data may be used as input for analytic models such as a machine learning models. However, these time-based models may not be sufficiently large or sufficiently trained to perform well under all types of conditions that may occur in the time series data. For example, a weather model that performs well under normal weather conditions may not perform well during a hurricane. A single monolithic model that performs well against all types of weather conditions may be prohibitively large and complex. Even if such a model can be built, its training and execution may require large amounts memory, processing power, and processing time on the underlying computing systems.

Accordingly, embodiments of systems and methods disclosed herein implement a change point detection system that can automatically update a simpler model responsive to predicted change points in input time series data. In some embodiments, the update may cause a machine learning model to receive additional training. In some embodiments, the update may adjust one or more tunable parameters of the model. In some embodiments, the update may cause the model to be replaced or augmented with a new model. The detection of the change point may be performed very quickly, so that the model may be updated in advance of the anticipated change point. In some embodiments, the change point detection may be implemented in an ongoing service that continually monitors input data to the time-based model and performs updates to the model when change points are detected in the near future. In this manner, the single monolithic model may be replaced with a smaller and simpler model (or a series of such models) that dynamically adapts to the changing conditions in the input data.

In some embodiments, the change point detection system may periodically examine input time series data for the model and generate a forecast of the data. In some embodiments, the forecasted data is examined for possible change points in the time series data using one or more change point detection methods.

In some embodiments, the change point may be detected by comparing a ratio of residual metrics before and after a potential change point in the forecast data. The method begins by obtaining a fitting function for the time series data. The fitting model may be obtained via a decomposition of the time series data to determine one or more modeled components (e.g., seasonal or trend component) and one or more noise components. The fitting model is then applied to a portion of the data before a point in the forecasted data and a portion of the data after the point to generate two residual metric values. When the two residual metric values are sufficiently different (e.g., when a ratio of the two deviates from 1), the detection system may report the point as a change point. In some embodiments, the residual metric may be computed using a likelihood function of residuals that may be generated from the fitting function, assuming a normal distribution of residuals. Advantageously, the residual comparison method is a relatively simple computation that can be executed very quickly by the computer and using very small amounts of memory, so that it can be performed repeatedly and frequently by a monitoring service to monitor a large number of time series data streams. Moreover, the method is intuitive to the user and readily configurable, making it a good choice to be exposed as a user feature in a configurable change point detection service.

In some embodiments, the change point may be detected by clustering individual time segments in the time series data via a clustering technique applied to the segments' data features. The method begins by segmenting the time series data, including the forecasted data, into individual time segments. The method may then extract data features from individual segments (e.g., the mean, variance, etc., of individual segments). A clustering technique may then be performed to group the time segments, according to their data features into a plurality of clusters having similar data features. In some embodiments, the cluster assignments for segments before a point in the forecast data and after the point are compared to generate a dissimilarity metric. In some embodiments, this dissimilarity metric is compared to a threshold to determine whether the point represents a change point. As with the residual comparison method, the clustering method may also be implemented as a simple computation that can be executed very quickly by the computer and using very small amounts of memory. Thus, the method can be performed repeatedly and frequently by a monitoring service to monitor a large time of time series data at scale. Additionally, in some embodiments, the clustering method is more configurable than the residual comparison method, because the clustering method allows a user to select from many different types of data features in the segments to determine the change point. Furthermore, the clusters produced by the method may be used to select time segments to be used as augmented training data for the model (e.g., to train the model with data that is similar to the forecast data). Accordingly, the clusters may be used to automate a variety of model tuning operations.

In some embodiments, multiple change point detection methods may be used in combination to determine a change point in the forecast data. For example, in some embodiments, one method such as the residual comparison method may be used as a primary method while a second method such as the clustering method may be used to corroborate the determined change point. In some embodiments, a cheaper method may be used to scan the forecast data for possible change points, and a more resource intensive method may be used to verify the possible change points detected by the first cheaper method. In some embodiments, different methods may be used to generate respective indicators, and the indicators may be combined in a weighted combination to produce an overall score for a point as the change point. In some embodiments, different change point detection methods may be used to implement a voting scheme or in a compound detection condition to determine a change point. In some embodiments, the change point detection system may allow users to add custom change point detection methods in order to determine change points according to their own custom criteria.

As may be understood, the disclosed systems and methods enable the construction of a highly performant, scalable, and configurable change point detection system that can be used to predict change points for input time series data for a plurality of models, and update the models in advance of the change points. As one skilled in the art will appreciate in light of this disclosure, certain embodiments may be capable of achieving certain advantages, including some or all of the following. In some embodiments, machine learning models for time series data may be improved to run faster, using less processing power and less memory. In some embodiments where the model is trained or executed in a distributed system, network usage and latencies may be reduced. In some embodiments, the change point detection system may include configuration interfaces for a change point detection service. These interfaces may present user interface elements to allow a user to easily configure the detection process. In some embodiments, the configuration interface may graphically depict any detected change points, so as to allow the user to better visualize the change point detection process and understand the effects of configuration parameter changes. These and other features and benefits of the inventive system and method are described in more detail below, in connections with the figures.

FIG. 1 is a block diagram illustrating an example change point detection system that is used to update a time-based model, according to some embodiments. In some embodiments, the change point detection system 130 may be hosted on one or more computer systems, such as the computer system illustrated in FIG. 12.

As shown, the change point detection system 130 may consume time series data 110 that is used as input data to an analytic model such as machine learning model 115, which produces an output based on the time series data. Model 115 may be any of a variety of models that can be used to make inferences or extracts information from the time series data 110. For example, in some embodiments, the time series data 110 may include web traffic data, and the model 115 may determine a dynamic ranking of various web content requested by the web traffic. In some embodiments, the time series data 110 may include performance metrics for a computing system, and the model 115 may determine a schedule to perform automated maintenance or scaling for the computing system. In some embodiments, the time series data 110 may include purchase histories of various users, and the model 115 may determine future purchase recommendations for the users. In some embodiments, the time series data 110 may include weather data, and the model 115 may generate weather warnings for different geographical locations. These applications are merely examples, and the disclosures provided herein may be used to detect change points in other types of data for other modeling applications.

As shown, the change point detection system 130 may include a time data forecasting component 132. In some embodiments, the time data forecasting component 132 may monitor 120 the time series data 110 and periodically generate a forecast 134 of the data into the future. For example, the forecaster 132 may take as input three months of web traffic data and generate a shorter forecast of the web traffic data for one week into the future. In some embodiments, the forecaster 132 may employ a probabilistic forecasting framework that is provided by a machine learning service or another forecasting system. In some embodiments, the forecaster 132 may employ an auto-regressive recurrent neural network model, which may be trained to continually generate future data for the time series based on observed time series data. In some embodiments, the forecasted time series data 134 may include different values such as means, quantiles, or other raw data for future time series data. In some embodiments, the raw data may be used to calculate other outputs in the future time data.

As shown, in some embodiments, the change point detection system may include a change point detection module or component 136. In some embodiments, the change point detector 136 may employ one or more change point detection methods to determine whether a change point exists in the forecasted data 134 based on one or more configurable criteria for determining change points. In some embodiments, the detector 136 may examine a range of points in the forecasted data 134 and identify multiple potential change points. In some embodiments, the detector 136 may compute a change point indicator for a range of points in the forecasted data 134 and report one or more points with the highest change point indicator values as the change points. In some embodiments, the detector 136 may report the earliest detected change point in the forecast data 134.

In some embodiments, the change point detector 136 may detect a change point by comparing a ratio of residual metrics before and after a potential change point in the forecast data 134. In some embodiments, a fitting model or function for the time series data may be derived from the time series data 110. In some embodiments, the fitting model may be obtained via a decomposition of the time series data to determine one or more modeled components (e.g., seasonal or trend component) and one or more noise components. In some embodiments, the fitting model is then applied to a portion of the data before a point in the forecasted data 134 and a portion of the data after the point to generate two residual metric values. When the two residual metric values are sufficiently different (e.g., when a ratio of the two deviates from 1), the detection system may report the point as a change point. In some embodiments, the residual metric may be computed using a likelihood function of residuals that may be generated from the fitting function, assuming a normal distribution of residuals.

In some embodiments, the change point may be detected by using a clustering technique that clusters individual time segments in the time series data 110. The individual time segments may be clustered based on the segments' data features. In some embodiments, the time series data 110 and the forecasted data 134 may be segmented into individual time segments. In some embodiments, the individual segments may be overlapping. In some embodiments, data features may be extracted from individual segments (e.g., the mean, variance, etc.). A clustering technique may then be performed to group the time segments, according to their data features into a plurality of clusters having similar data features. In some embodiments, the cluster assignments for segments before a point in the forecast data 134 and after or including the point are compared to generate a dissimilarity metric. In some embodiments, this dissimilarity metric is compared to a threshold to determine whether the point represents a change point.

In some embodiments, multiple change point detection methods may be used in combination to determine a change point in the forecast data 134. For example, in some embodiments, one method such as the residual comparison method may be used as a primary method while a second method such as the clustering method may be used to corroborate the determined change point. In some embodiments, a cheaper or less resource or time intensive method may be used to scan the forecast data for possible change points, and a more resource or time intensive method may be used to verify the possible change points detected by the first method. In some embodiments, different methods may be used to generate respective indicators, and the indicators may be combined in a weighted combination to produce an overall score for a point as the change point. In some embodiments, different change point detection methods may be used to implement a voting scheme or in a compound detection condition to determine a change point.

As shown, in some embodiments, the change point detection system 130 may implement a model update module or component 138 to perform updates 125 to the model 115. In some embodiments, the model updater 138 may be triggered by the detection of a change point in the forecast data 134. Upon such a detection, the updater 138 may cause the model to be refreshed in advance of the predicted change point. In some embodiments, this refreshing may occur automatically with no human intervention. In some embodiments, the updater 138 may cause a machine learning model 115 to receive additional training. In some embodiments, the updater 138 may adjust one or more tunable parameters of the model 115. In some embodiments, the updater 138 may cause the model 115 to be replaced or augmented with a different model. In some embodiments, the update 125 may be sent as a job to a machine learning service that is hosting the machine learning model 115 or responsible for updating the model 115. In some embodiments, the machine learning service may expose a programmatic interface to allow managed models to be tuned or trained based on input parameters.

As shown, in some embodiments, the change point detection system 130 may implement a reporting interface 140. In some embodiments, the reporting interface 140 may be an interactive graphical user interface that can visually display one or more detected change points for a time series data 110. In some embodiments, the reporting interface may be a programmatic interface. In some embodiments, the reporting interface may implement a callback interface, where a client may register as a listener to be notified when a change point is detected. For example, a stock trading application may use the change point detection system 130 to monitor stock prices, so that when a specified change point is detected in price movement, a notification is automatically forwarded to the stock trading application. Depending on the embodiment, the notification may be a message sent via a particular protocol, an update to a data repository, or a write to a log, among other things. In some embodiments, the listening application (e.g., the stock trading application) may respond to the notification by performing particular actions (e.g., sell a stock).

In some embodiments, as shown, the change point detection system 130 may implement a configuration interface 142. In some embodiments, the change point detection system 130 may be configured via the configuration interface 142 to monitor different sources of time series data 110 and update different consuming models 115. In some embodiments, the configuration interface 142 may be an interactive graphical user interface. In some embodiments, the configuration interface 142 may be a programmatic interface. In some embodiments, the configuration interface may include a data repository that stores the configuration data of the system. In some embodiments, the configuration data may be stored as one or more metadata files.

The configuration interface 142 may be used to adjust different parameters of the various components in the change point detection system 130. For example, in some embodiments, the configuration interface may allow for the configuration of different parameters that control how a change point detection method is performed. For example, a change point detection threshold may be specified as a configurable parameter. In some embodiments, the change point threshold may be determined by a function, which may be controlled by one or more configurable parameters. In some embodiments, the configuration interface may allow a new or custom change point detection method to be added to the system 130.

In some embodiments, the manner in which the model 115 is updated by the model updater 138 is also configurable. For example, the configuration parameter may specify how a training of the model should be performed and specify a manner in which augmented training data sets are selected. In some embodiments, the configuration information may specify how a new model should be selected to replace or augment the existing model 115. In some embodiments, the change point detection system 130 may be configured to detect multiple different types of changes points (e.g., a peak or a trough) and associate different model updates to the different types.

Figure 2:
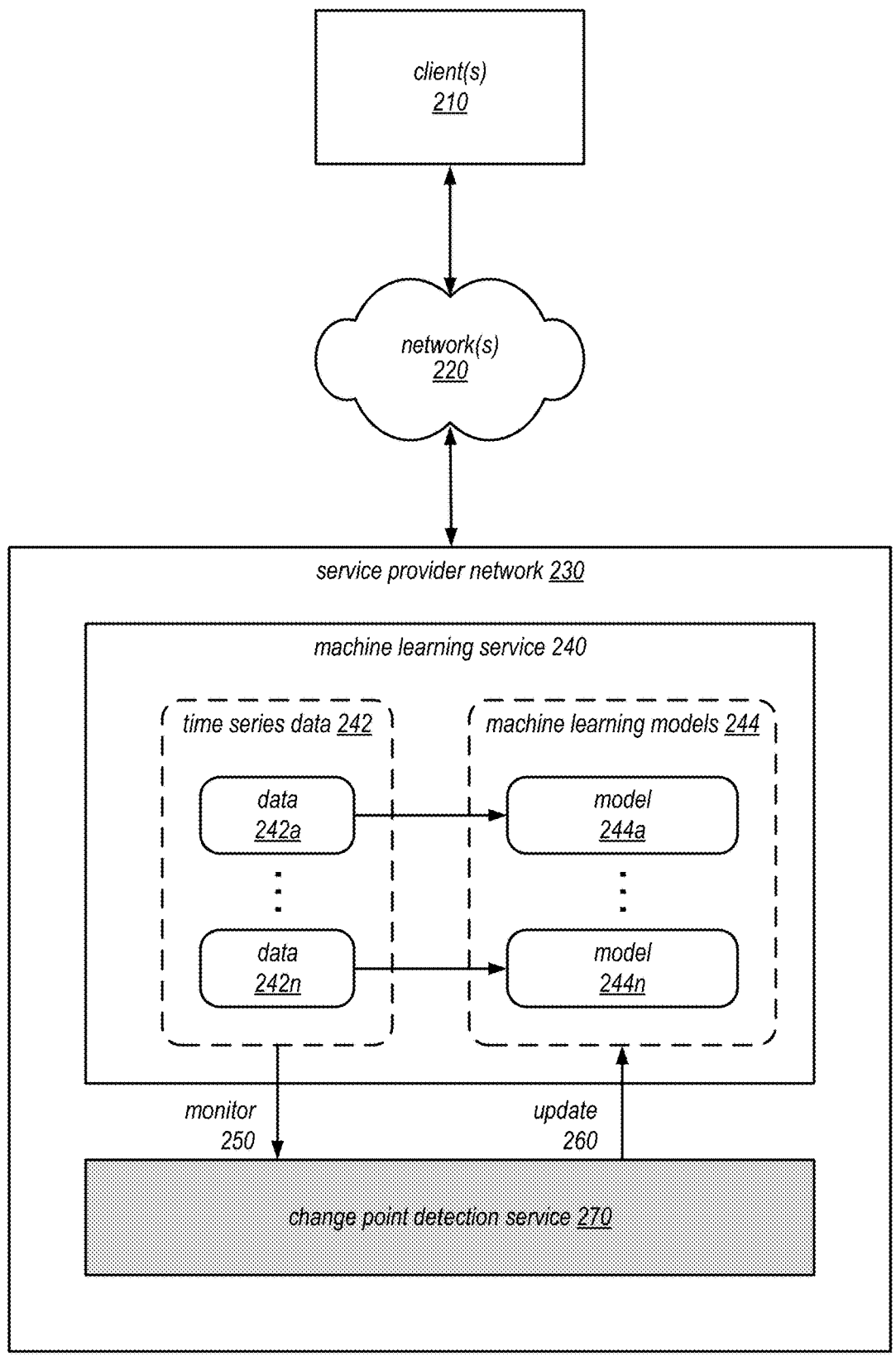
FIG. 2 is a block diagram illustrating an example service provider network that hosts a change point detection service used to update time-based machine learning models, according to some embodiments.

FIG. 2 is a block diagram illustrating an example service provider network that hosts a change point detection service used to update time-based machine learning models, according to some embodiments. As shown, in some embodiments, a service provider network 230 may host a change point detection service 270 that implements a change point detection system, such as the system 130 as discussed in connection with FIG. 1. As shown, the service provider network 230 may interact with a plurality of client(s) 210 over a network 220.

The service provider network 230 may provide computing resources via one or more computing services to the client(s) 210. The service provider network 230 may be operated by an entity to provide one or more services, such as various types of cloud-based computing or storage services, accessible via the Internet and/or other networks to client(s) 210. In some embodiments, the service provider network 230 may implement a web server, for example hosting an e-commerce website. Service provider network 230 may include numerous data centers hosting various resource pools, such as collections of physical and/or virtualized computer servers, storage devices, networking equipment and the like, needed to implement and distribute the infrastructure and services offered by the service provider network 230. In some embodiments, service provider network 230 may provide computing resources to clients. These computing resources may in some embodiments be offered to client(s) 210 in units called "instances," such as virtual compute instances.

The client(s) 210 may encompass any type of client configurable to submit requests to the service provider network 230. For example, a given client 210 may include a suitable version of a web browser or may include a plug-in module or other type of code module configured to execute as an extension to or within an execution environment provided by a web browser. Alternatively, a client 210 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 210 may be configured to generate network-based services requests according to a Representational State Transfer (REST)-style network-based services architecture, a document- or message-based network-based services architecture, or another suitable network-based services architecture. In some embodiments, the service provider network 230 may offer its services as web services, and the client(s) 210 may invoke the web services via published interfaces for the web services. In some embodiments, a client 210 (e.g., a computational client) may be configured to provide access to a computing service 230 in a manner that is transparent to applications implemented on the client(s) 210 utilizing computational resources provided by the service provider network 230.

The client(s) 210 may convey network-based services requests to the service provider network 230 via network 220. In various embodiments, network 220 may encompass any suitable combination of networking hardware and protocols necessary to establish network-based communications between clients 210 and service provider network 230. For example, a network 220 may generally encompass the various telecommunications networks and service providers that collectively implement the Internet. A network 220 may also include private networks such as local area networks (LANs) or wide area networks (WANs) as well as public or private wireless networks. For example, both a client 210 and the service provider network 230 may be respectively provisioned within enterprises having their own internal networks. In such embodiments, the network 220 may include the hardware (e.g., modems, routers, switches, load balancers, proxy servers, etc.) and software (e.g., protocol stacks, accounting software, firewall/security software, etc.) necessary to establish a networking link between the client 210 and the Internet as well as between the Internet and service provider network 230. In some embodiments, client(s) 210 may communicate with service provider network 230 using a private network rather than the public Internet.

As shown, in some embodiments, the service provider network 230 may host a plurality of different services for the client(s) 210. For example, two of these services may include a machine learning service 240 and the change point detection service 270. In some embodiments, the change point detection service 270 may be implemented within or as a part of the machine learning service 240.

In some embodiments, the machine learning service 240 (MLS) may implement a set of programmatic interfaces (e.g., APIs, command-line tools, web pages, or standalone GUIs) that can be used by client(s) 210 to submit requests for a variety of machine learning tasks or operations. The machine learning service 240 may include a control plane that comprises a plurality of components (including a request handler, workload distribution strategy selectors, one or more job schedulers, metrics collectors, and modules that act as interfaces with other services). The data plane of the MLS may include, for example, a resource pool, storage devices that are used to store input data sets, intermediate results or final results (some of which may be part of the MLS artifact repository), and the network pathways used for transferring client input data and results.

In some embodiments, a job object submitted to the MLS 240 may indicate one or more operations that are to be performed as a result of the invocation of a programmatic interface, and the scheduling of a given job may in some cases depend upon the successful completion of at least a subset of the operations of an earlier-generated job. In at least some implementations, the MLS job queue may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS client). After the processing plan has been generated and the appropriate set of resources to be utilized for the job has been identified, the job's operations may be scheduled on the resources. Results of some jobs may be stored as MLS artifacts within a results repository in some embodiments.

In some embodiments, client requests may result in the immediate generation, retrieval, storage, or modification of corresponding artifacts within MLS artifact repository by the MLS request handler. A client request may also indicate one or more parameters that may be used by the MLS to perform the operations, such as a data source definition, a feature processing transformation recipe, or parameters to be used for a particular machine learning algorithm. In some embodiments, artifacts respectively representing the parameters may also be stored in MLS repository. Some machine learning workflows, which may correspond to a sequence of API requests from a client, may include the extraction and cleansing of input data records from raw data repositories (e.g., repositories indicated in data source definitions) by input record handlers of the MLS. The input data may comprise data records that include variables of any of a variety of data types, such as, for example the time series data 242 as shown. As shown, time series data may contain individual series of time data 242*a-z* for different machine learning models 244*a-n*.

The output produced by the input record handlers may be fed to one or more feature processors, where a set of transformation operations may be performed in accordance with recipes using another set of resources from the resource pool. The output of the feature processing transformations may in turn be used as input for a selected machine learning algorithm, which may be executed in accordance with algorithm parameters using yet another set of resources from the resource pool. A wide variety of machine learning algorithms may be supported natively by the MLS libraries, including for example random forest algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

In some embodiments, as shown, the change point detection service 270 may obtain or monitor 250 different time series data 242*a-z* for respective machine learning models 244*a-z* managed by the MLS 240. In some embodiments, the time series data 242 may be obtained or monitored from a data source outside of the MLS 240. In some embodiments, as discussed previously, the change point detection service 270 may predict or detect a change point an individual sequence of time series data 242, according to the configuration settings for that data. In some embodiments, the detection of the change point may trigger an update 260 to the model 244 corresponding to the time series data. In this manner, the change point detection service may oversee a large number of time series data 242 for a large number of models 244, and automatically refresh a corresponding model when a change point is detected in its input data. In some embodiments, the detection of the change point in the time series data 242 may be performed very quickly, so that the model 244 may be updated or trained in advance of the anticipated change point. In some embodiments, the change point detection service may be implemented as a continually-running background service that monitors the input data for a large number of managed models 244.

Figure 3:
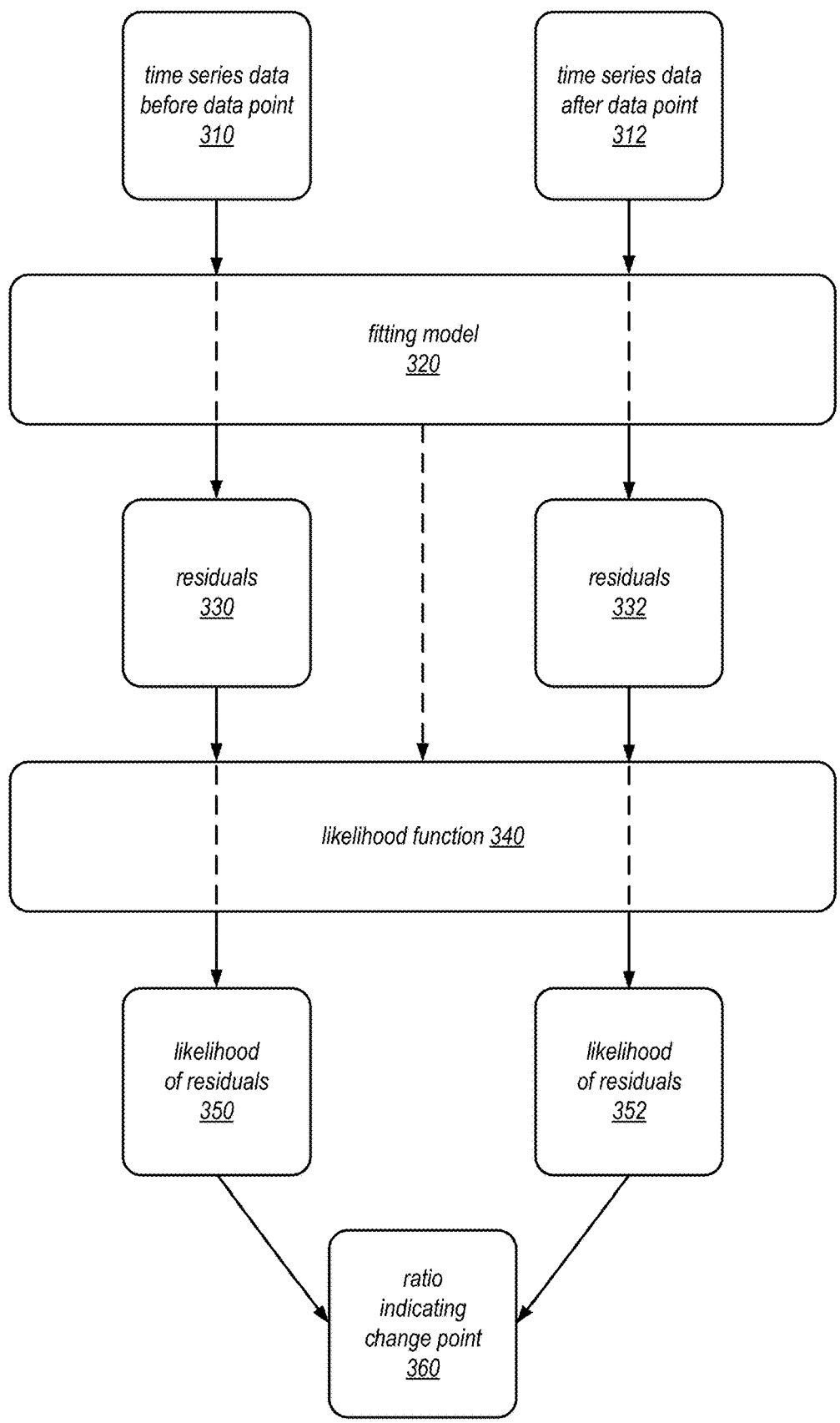
FIG. 3 illustrates an example process of detecting a change point in time series data using a ratio of residual metrics generated by a fitting model, according to some embodiments.

FIG. 3 illustrates an example process of detecting a change point in time series data using a ratio of residual metrics generated by a fitting model, according to some embodiments.

A change point at time $t=\tau$ signifies that the data generating process has changed. Given a time series $Z_i=[z_{i,1}, z_{i,2}, \ldots, z_{i,M}]$ generated by a process $D_{i,1}$ for $t<\tau$, that process changes $D_{i,2}$ at $t=\tau$. Formally:

$$z_{i,t} = \|_{t<\tau} D_{i,1} + \|_{t=\tau} D_{i,2} \forall t \in [1, \ldots, M] \quad (1)$$

In some embodiments of the ratio of residuals method, a likelihood of ratio is used on the residuals of the time series data to infer change points on the forecasted data. As shown, in some embodiments, the method begins by decomposing the time series $Z_i$, since the last change point, into seasonal, trend, and noise components using model $f_{A_i}(t)$. Then, the residuals $\varepsilon_i$ are computed and fitted to a Gaussian distribution of residuals using a maximum likelihood estimation to estimate a variance parameter $\hat{\sigma}^2$. In some embodiments, a distribution other than Gaussian distribution may be used.

Given the model $f_{A_i}(t)$ and $\varepsilon_i \sim N(0, \hat{\sigma}^2)$, the residual metric ratio 360 is computed for each $t_0$. A change point will be declared at $\tau = t_0$ when the computed ratio exceeds a threshold function $\gamma(\cdot)$. Here $t_0 \in [\tau_p, \ldots, M]$.

Formally, the process first estimates the model $f_{A_i}(t)$ on the time series data $\hat{Z}_{i,t} = [z_{i,\tau_p}, \ldots, z_{i,M}]$ since the last change point $\tau_p$ and computes the residuals on all of the data.

$$\varepsilon_{i,t} = f_{A_i}(t) - Z_{i,t} t \in [\tau_p, \ldots, M] \quad (2)$$

Thus, as shown, a fitting model 320 is derived from the time series data, and the respective residuals 330 and 332 are computed for time series data (e.g., forecasted time series data 134) both before and after a potential change point. The process then assumes that the residuals are random noise and model them as an iid white noise process $\sim N(0, \hat{\sigma}^2)$ where the maximum likelihood estimate for $\hat{\sigma}$ is $$MLE(\sigma^2) = \frac{\sum \varepsilon_{i,t}^2}{n} \quad (3)$$

where n is the window length before and after the point of interest $t_0$.

The process then triggers a change point when the distribution of the residuals changes, which is defined as occurring when the likelihood ratio of the before ($t \le t_0$) and after ($t > t_0$) change point segments or portions of the data exceeds a certain value determined by the $\gamma(\cdot)$ threshold function. The likelihood function $L(\cdot)$ is defined over a segment of iid residuals of length n as:

$$\mathcal{L}(\varepsilon_{i,t_1:t_n} \mid \hat{\sigma}^2) = p(\varepsilon_{i,t_1}, \ldots, \varepsilon_{i,t_n} \mid \hat{\sigma}^2) \quad (4)$$

$$= \prod_{j=1}^{n} p(\varepsilon_{i,t_j} \mid \hat{\sigma}^2)$$

$$= (2\pi\hat{\sigma}^2)^{-n/2} \exp\left(-\frac{1}{2\hat{\sigma}^2} \sum_{j=1}^{n} \varepsilon_{i,t_j}^2\right)$$

The likelihood function (4) decomposition into a product of normal probability distribution function computations follows from the assumption that the residuals are iid and normally distributed. Using the log likelihood $l(\cdot)$ of the process simplifies the computations into a simple comparison the sum of squared residuals of the forecast data versus the historical data.

$$\ell(\varepsilon_{i,t_1:t_n} \mid \hat{\sigma}^2) = -\frac{n}{2}\log(2\pi\hat{\sigma}^2) - \frac{1}{2\hat{\sigma}^2}\sum_{j=1}^{n}\varepsilon_{i,t_j}^2 \quad (5)$$

$$\frac{\ell(\varepsilon_{i,t_0-n+1:t_0} \mid \hat{\sigma}^2)}{\ell(\varepsilon_{i,t_0+1:t_0+n} \mid \hat{\sigma}^2)} = \frac{c + \sum \varepsilon_{i,t}^2}{c + \sum \varepsilon_{i,t}^2} \quad (6)$$

where $c = n\hat{\sigma}^2 \log(2\pi\hat{\sigma}^2)$.

Thus, as shown in the figure, the likelihoods 350 and 352 of the residuals 330 and 332 are determined via the likelihood function 340. A ratio 360 is then determined from the likelihoods, as shown. This process holds for equal length segments. In some embodiments, segments of unequal lengths can be compared by scaling their respective segment lengths. If a change point is present in the forecast data, the likelihood ratio of (6) is expected to deviate from 1.

$$1 - \min\left(\frac{\ell(\varepsilon_{i,t_0-n+1:t_0} \mid \hat{\sigma}^2)}{\ell(\varepsilon_{i,t_0+1:t_0+n} \mid \hat{\sigma}^2)}, \frac{\ell(\varepsilon_{i,t_0+1:t_0+n} \mid \hat{\sigma}^2)}{\ell(\varepsilon_{i,t_0-n+1:t_0} \mid \hat{\sigma}^2)}\right) > \gamma(n, \sigma_b) \quad (7)$$

In some embodiments, for each candidate change point of $t_0$, the process computes (7) and decide whether $t_0$ is a change point. In some embodiments, the term $\gamma(n, \sigma_b)$ assumes a general exponential decay functional form to allow the user to configure how the magnitude of the change point threshold should vary with n and the confidence measure of the decomposition model $f_{A_i}(t)$, denoted as $\sigma_b$.

$$\gamma(n, \sigma_b) = \alpha\sigma_b \exp\left(-\frac{\lambda n}{\sigma_b}\right) \quad (8)$$

where $\alpha$ is a constant representing an upper bound for the change point threshold.

The formulation in equation (8) allows the user to use a smaller change point threshold for differences spread across larger time segments and similarly requires a large threshold for shorter windows. Further, analysis on noisier decomposition (represented by larger $\sigma_b$) will yield larger constants as well as a slower decay factor over time representing the desired to be more conservative with more uncertainty in the decomposition.

Figure 4:
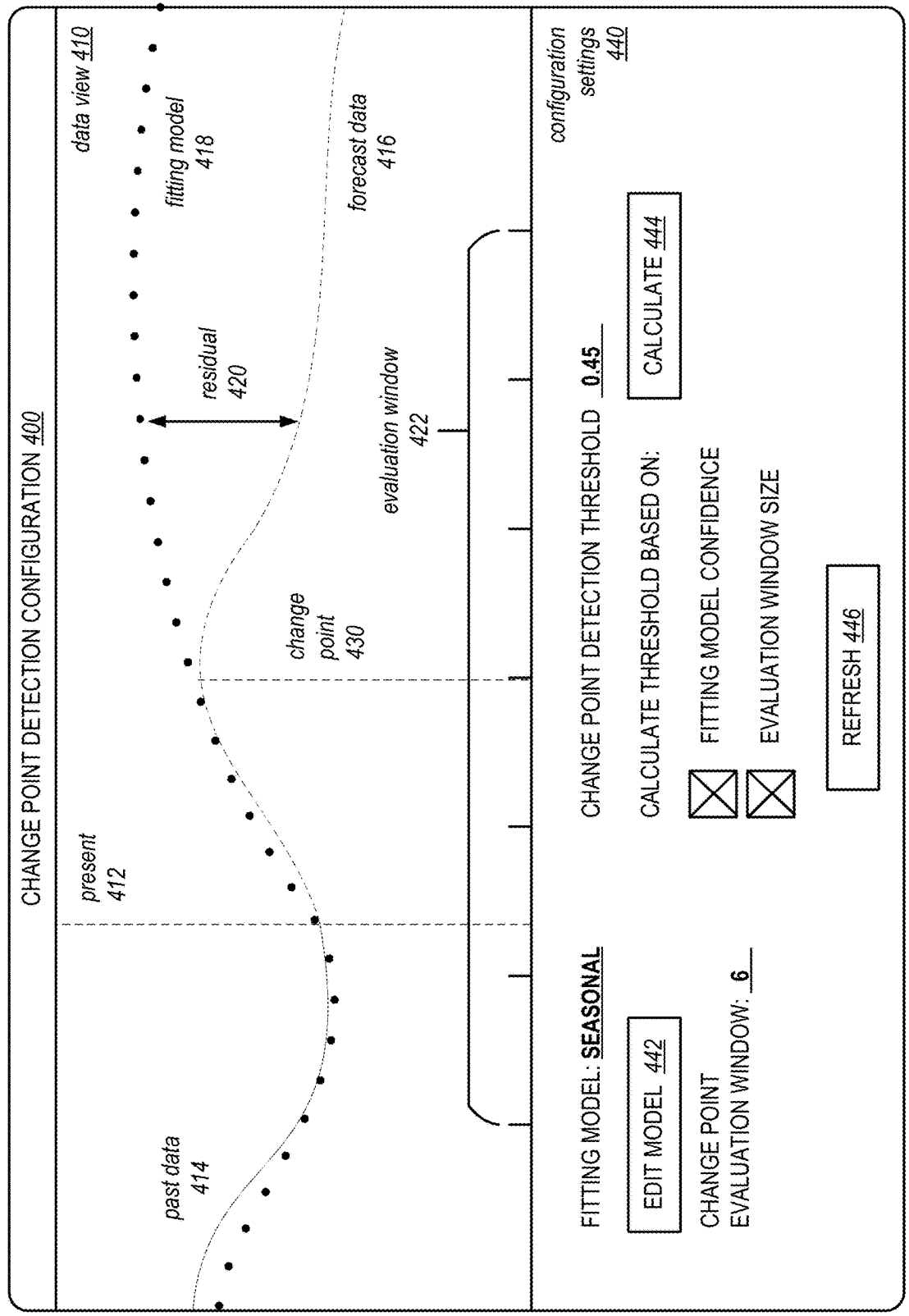
FIG. 4 illustrates an example user interface for viewing a change point detected in time series data and configuring a change point detection method using a ratio of residual metrics, according to some embodiments.

FIG. 4 illustrates an example user interface for viewing a change point detected in time series data and configuring a change point detection method using a ratio of residual metrics, according to some embodiments. In some embodiments, the user interfaces depicted in the figure may be part of the configuration interface 142, as discussed in connection with FIG. 1.

In some embodiments, the configuration user interface 400 may be used to configure various parameters associated with a residual metric ratio method for change point detection, as discussed previously. As shown, the user interface 400 may include a data view 400 and a configuration settings view 440.

As shown, the data view 410 may be used to allow a user to visualize detected change points. By showing the visualization of how the change point is determined with the configuration settings, the user interface 400 allows users to better understand the effects of the various configuration parameters. The feature allows a user to immediately see the impacts of his or her configuration choices, without having to wait for actual results to evaluate the performance of the change point detection method. For example, the user interface 400 may include a refresh button 446, which may cause the data view 410 to be updated based on the configuration parameter settings in the settings view 440. In some embodiments, the refreshed data view 410 may display one or more detected change points (e.g., change point 430) according to the configuration settings.

In this example, as shown, the data view displays a time series of data ends at the point marked present 412. The past or historical portion of the data 414 is displayed in a solid curve. The forecasted portion of the data 416 is displayed in a dashed curve beyond the present mark 412. As discussed, in some embodiments, the forecast data 416 may be generated using a data forecasting technique, such as a recurrent neural network implemented in a forecasting service. As shown, the data view 410 also displays another curve in a dotted line that represents the fitting model 418. As discussed, in some embodiments, the fitting model 418 may be determined via a decomposition of the time series data. The difference between the fitting model 418 and the forecast data 416 at individual points in time indicate the residual 420 of the fitting model.

As shown, in this example, the change point 430 has been detected using the residual metric ratio method. In this example, the residual metrics are determined from an evaluation window 422 of six time units. Depending on the embodiment, these time units may represent different periods of time, such as a month, a day, an hour, etc. In this example, a residual metric may be computed for the three time units before the change point 430, and another residual metric may be computed for the three time units after the change point 430. In this example, as shown, the residuals before the change point 430 are smaller than the residuals after the change point 430, and thus, a ratio of the two residual metrics may indicate that point 430 represents a change point.

As shown, the configuration settings view 440 includes a number of configuration settings that may be configured by a user. In some embodiments, the user interface may allow the user to select or configure the fitting model 418. In this example, the fitting model selected is a model named "SEASONAL." The EDIT MODEL button 442 may be used to select or adjust the fitting model. In some embodiments, the fitting model may be extracted from the time series data via a decomposition technique.

As shown, the configuration settings may also include a change point window size setting. Here, the window is set to a size of six time units. In some embodiments, a larger windows size favors the detections of more gradual change points.

As shown, in this example, the configuration settings may include a change point detection threshold setting, here set to 0.45. In some embodiments, this value may be compared to the residual metric ratio to determine when a change point has occurred. As shown, in some embodiments, the threshold may be automatically computed, for example via the CALCULATE button 444. In some embodiments, the threshold computation may be performed using a configurable threshold function. As shown, in this example, the threshold function may be dependent on a confidence measure of the fitting model (which may be determined during the decomposition process), and also the evaluation window size.

Figure 5:
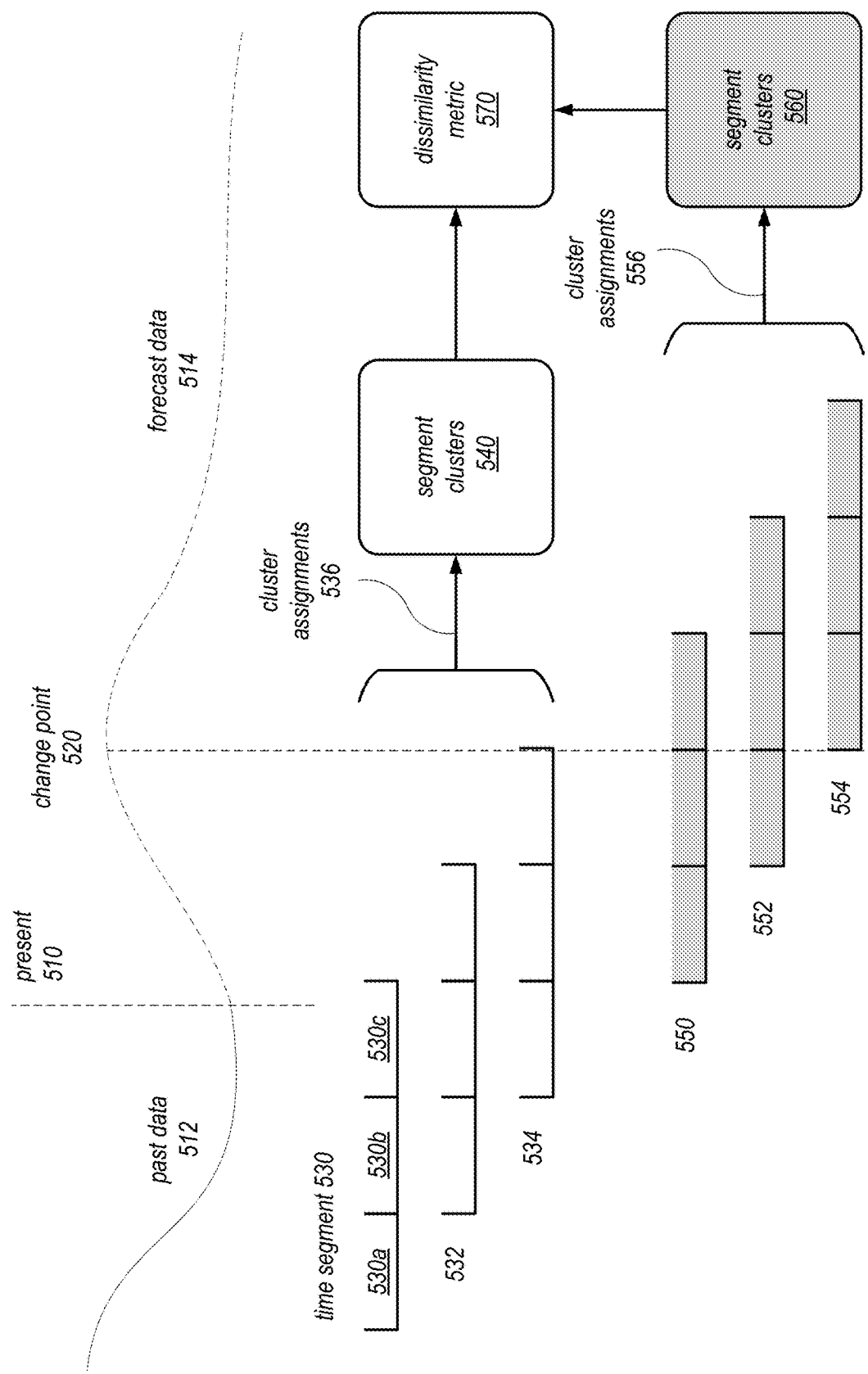
FIG. 5 illustrates an example process of detecting a change point in time series data via a feature-based clustering of time segments in the time series data, according to some embodiments.

FIG. 5 illustrates an example process of detecting a change point in time series data via a feature-based clustering of time segments in the time series data, according to some embodiments.

In some embodiments, the clustering technique may be used to determine a change point by more holistically considering the overall behavior of a forecasted time series data. In this method, for a point $t_0$ and metric $Z_i$, the observed and forecasted time series values are divided into segments or sub-series of length p which are denoted as $Z_{i_j}=[z_{i,j}, z_{i,j+1}, \ldots, z_{i,j+p}]$. As shown, in some embodiments, these segments may be overlapping. In some embodiments, the segments may be determined using a rolling-windows method. In some embodiments, feature vectors (per Table 1) may be extracted from each sub-series and a hierarchical clustering technique may be applied on those feature vectors to obtain K-groups across all $Z_{i,j}$. Table shows a list of different types of data features that may be extracted from the segments and used to cluster the segments. In different embodiments, different or additional data features may be used. An explanation of some of the data features in the Table are provided in Rob J. Hyndman, Earo Wang, and Nikolay Laptev. Large-scale unusual time series detection. In 2015 IEEE International Conference on Data Mining Workshop (ICDMW), pages 1616-1619, November 2015. In some embodiments, K may be chosen to be the smallest value that is needed to capture a certain percentage of the total between-cluster sum of squares (i.e. variance).

TABLE 1

Summary of features used in time series decomposition

| Feature | Description |
| --- | --- |
| Mean | Mean. |
| Var | Variance. |
| ACF1 | First order of autocorrelation. |
| Trend | Strength of trend. |
| Linearity | Strength of linearity. |
| Curvature | Strength of curvature. |
| Season | Strength of seasonality. |
| Peak | Strength of peaks. |
| Trough | Strength of trough. |
| Entropy | Spectral entropy. |
| Lumpiness | Changing variance in remainder. |
| Spikiness | Strength of spikiness. |
| Lshift | Level shift using rolling window. |
| Vchange | Variance change. |
| Fspots | Flat spots using discretization. |
| Cpoints | The number of crossing points. |
| KLscore | Kullback-Leibler score. |
| Change.idx | Index of the maximum KL score. |

In some embodiments, the process defines a refresh strength signal $R_{t_0}$ in (9) which the dissimilarity of cluster assignments between the forecasted data versus our historical data with the same cluster assignments providing one base case where the metric $R_{t_0}$ would equal zero. In some embodiments, the dissimilarity metric may be determined for cluster assignments for time segments before a potential change point and time segments that include or occur after the potential change point. When constructing the dissimilarity metric, attention may be restricted to a set of sub-series or segments around $t_0$ (as the process is primarily concerned with identifying a change point around $t_0$) and a neighborhood radius equal to T, step sizes, each of length p, yielding [2T/s] sub-series. In some embodiments, the length p and the step-size s of the rolling windows may be two hyper-parameters, which in some embodiments may be configurable via the configuration interface 142. Depending on the embodiment, the sub-series may be overlapping or exclusive.

In some embodiments, the dissimilarity metric may be used to quantify the dissimilarity of the group assignment distribution obtained from our clustering algorithm. Let $Z_i^+$ denote the set of sub-series containing at least one forecasted value (or a set of sub-series before the potential change point $t_0$) and $Z_i^-$ represent the complement (i.e. all sub-series $Z_{i_j}$ containing no forecasted values or a set of sub-series including or occurring after the potential change point $t_0$). Let $h(\cdot)$ be the function that maps the set of sub-series to a set of cluster assignments $g=\{g_j: 1 \leq j \leq [2T/s]\}$, for each $Z_{i_j}$ in the set. One example of such sub-series of time segments is shown in FIG. 5.

In some embodiments, because the K parameter is a positive integer, the group assignment distribution is discrete. In some embodiments, the dissimilarity metric used may be defined as below. Other dissimilarity metrics may be used in different embodiments. For example, some types of dissimilarity metrics related to object detection in computer vision are described in Jan Hendrik Hosang, Rodrigo Benenson, and Bernt Schiele. How good are detection proposals, really? CoRR, abs/1406.6962, 2014.

$$R_{t_0} = 1 - \frac{h(Z_i^+) \cap h(Z_i^-)}{h(Z_i^+) \cup h(Z_i^-)} \quad (9)$$

In some embodiments, the ratio term in the dissimilarity metric or refresh signal strength $R_{t_0}$ may be reflect a ratio of a count of unique overlapping group assignments and a count of all unique group assignments for the time series data. The count of unique overlapping group assignment may be determined as the count of common unique group assignments between 1) time series segments before the potential change point and 2) time series segments including or occurring after the potential change point. In some embodiments, if the refresh signal strength $R_{t_0}$ exceeds a predefined or configurable threshold, $t_0$ may be recognized or flagged as a change point in the time series data.

Advantageously, the clustering method generate the clusters of time segments as an intermediate result of the process. These generated clusters provide a natural way to inform data augmentation in a model estimation or training phase. For example, the underlying model may be trained on historical time points t which map to the same cluster as the sub-series starting with $$v = \left\{ U \min\{t, t_0\} : t \in [i, j+p], h(Z_{i_j}) = h(Z_{i_{t_0}}) \right\} \quad (10)$$

and train the model on v with the idea being that the time points in the same cluster capture seasonality and trends better, because the historical data exhibiting similar data characteristics are clustered together. In some embodiments, the training data augmentation may include time segments from the same cluster in combination with recent data with respect to the change point.

In FIG. 5, the time series data is again divided into past data 512 and forecasted data 514 at the present mark 510. Using the clustering method, a change point 520 is detected, as shown. In this example, three sub-series feature vectors immediately preceding the point in question and immediately including or after the point are clustered. As shown, this process generates two sets of clusters 540 and 560 for the two segment groups. These cluster assignments are then used to determine a dissimilarity metric 570. As discussed, in some embodiments, the dissimilarity metric may be determined based on a ratio of common clusters between the two sets and all clusters in the two sets. In some embodiments, this dissimilarity metric 570 may be used as a model refresh signal. In some embodiments, if the signal exceeds a configurable threshold, the model may be automatically updated.

Figure 6:
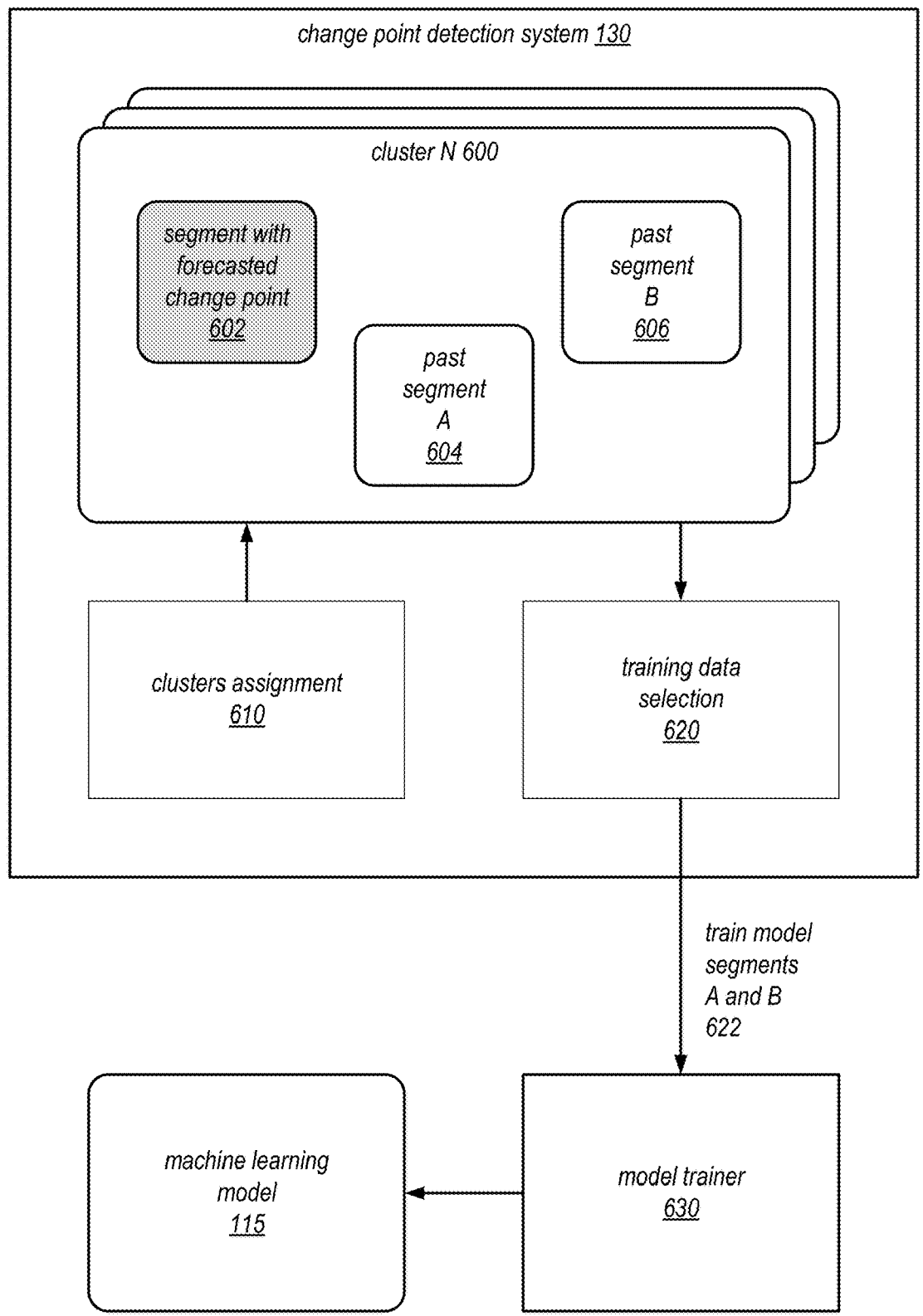
FIG. 6 illustrates an example process of updating a machine learning model with augmented training data selected from input time series data using a feature-based clustering technique, according to some embodiments.

FIG. 6 illustrates an example process of updating a machine learning model with augmented training data selected from input time series data using a feature-based clustering technique, according to some embodiments.

As shown, the change point detection system 130 may in some embodiments implement a cluster assignment component or module 610. In some embodiments, this component 610 may be implemented to perform the clustering technique used to detect change points in the time series data. In some embodiments, component 610 may be implemented as a part of change point detector 136, as discussed in connection with FIG. 1.

As shown, in some embodiments, the cluster assignment component 610 may generate a plurality of clusters that groups segments in the time series data (including forecasted segments) according to their respective feature vectors. As shown, one cluster (cluster N 600) includes three segments, the segment with the forecasted change point 602, and two past segments A 604 and B 606. In some embodiments, these segments may be grouped together because they exhibit similar data characteristics.

As shown, in some embodiments, the change point detection system 130 may implement a training data selector module or component 620. In some embodiments, the training data selector may be implemented as part of the model updater 138, as discussed in connection with FIG. 1. In some embodiments, the detection of a future change point in the time series data may cause the model that uses the data to be refreshed. In some embodiments, the refresh may involve a retraining of the model using augmented training data. Thus, the training data selector 620 may be select training data based on the clustering to be used to perform the retraining. For example, the training data selector 620 may select segments from the same cluster as the change point cluster 602 to perform the retraining. In some embodiments, the training data selector 620 may select past segments from each cluster that are associated with a forecasted segment to retrain the model. In some embodiments, the training data selector may select training data using other criteria. In some embodiments, the training data selector may randomly sample segments from selected clusters in a pseudorandom fashion.

As shown, in this example, past segments A and B are selected and provided 622 to a model trainer 630, which in turn uses the data to retrain or refresh the machine learning model 115. In some embodiments, the model trainer may be implemented as part of a machine learning service, such as MLS 240 discussed in connection with FIG. 2. In some embodiments, refresh or update to the model 115 may be submitted as a machine learning job to the machine learning service via a programmatic interface. In some embodiments, the refresh or update to the model 115 may occur in real time as change points are detected and complete in advance of the actual change point. Thus, the model may be continually adapted to anticipated changes in the time series data.

Figure 7:
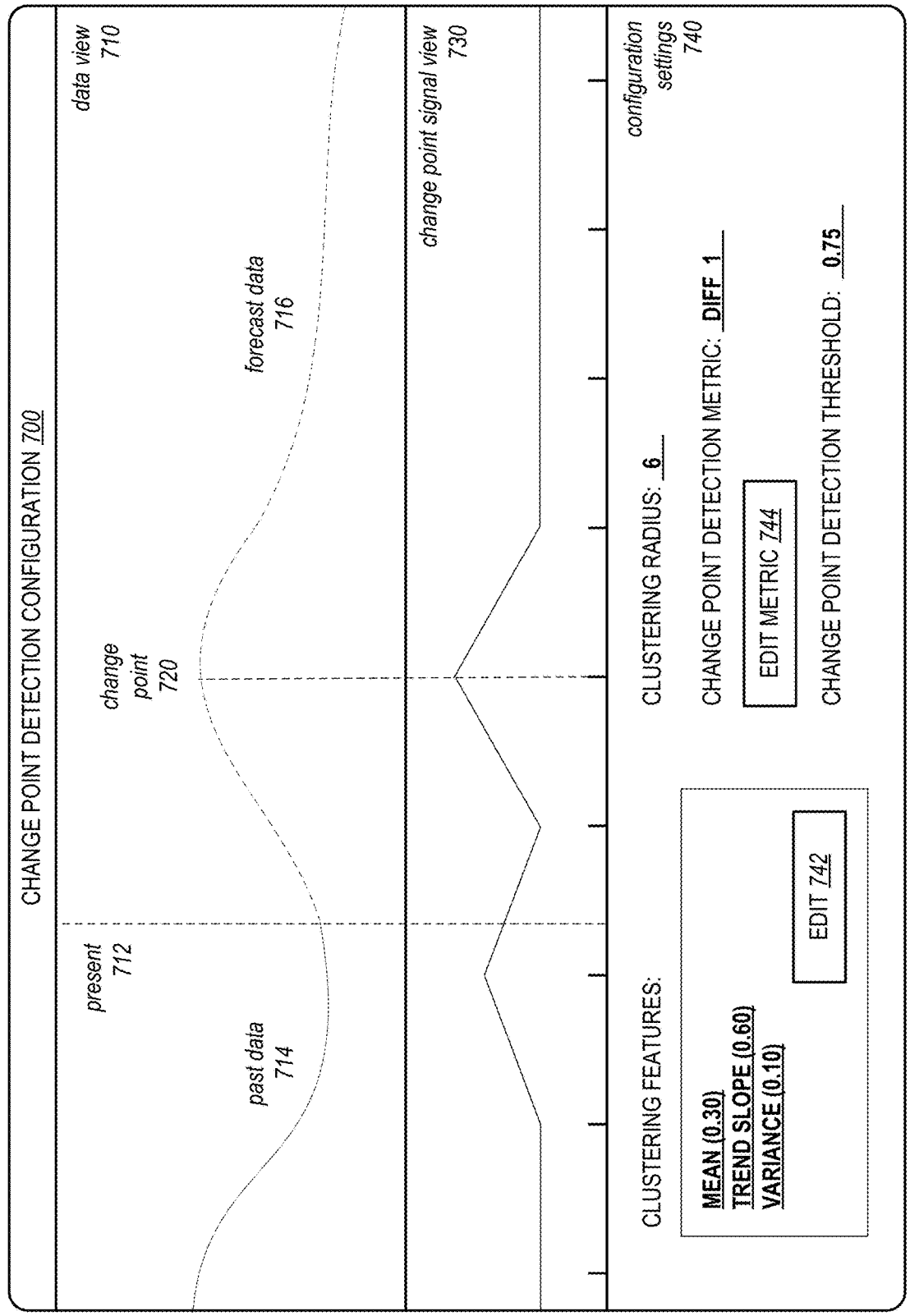
FIG. 7 illustrates an example user interface for viewing a change point detected in time series data and configuring a change point detection method using a feature-based clustering technique, according to some embodiments.

FIG. 7 illustrates an example user interface for viewing a change point detected in time series data and configuring a change point detection method using a feature-based clustering technique, according to some embodiments. In some embodiments, the depicted user interface 700 may be implemented as part of the configuration interface 142, as discussed in connection with FIG. 1.

As shown, in some embodiments, the change point detection configuration interface 700 may be a graphical user interface that includes a data view 710, a change point signal view 730, and a configuration settings view 740. In some embodiments, by showing the visualization of how the change point is determined with the configuration settings, the user interface 700 allows users to better understand the effects of the various configuration parameters. The feature allows a user to immediately see the impacts of his or her configuration choices, without having to wait for actual results to evaluate the performance of the change point detection method.

In the data view 710, similar to data view 410 in user interface 400, the time series data is divided into past data 714 and forecasted data 716 at the present mark 712. As shown, a change point 720 is detected in the forecast data via the clustering method.

In the change point signal view 730, the user interface 700 displays a signal metric that indicates whether a corresponding point in the time series data represents a change point. The metric may be a model refresh signal or a dissimilarity metric that can be derived from the time segment clusters, as discussed previously. As shown, the change point 720 corresponds to a peak in the change point signal graph.

As shown, the configuration settings view 740 includes control elements that allow a user to adjust various configuration parameters of the clustering method. As shown, in some embodiments, the data features used to perform the clustering may be configured. In some embodiments, the data features may be collected into a feature vector. In some embodiments, the individual features may be weighed according to a feature weight, as shown. In this example, the trend slope feature is weighted most heavily. As shown, the EDIT button 742 may be used to modify the set of features used and how the features are used to perform the clustering.

As shown, the configuration interface may allow the user to adjust the clustering radius that is to be used for the clustering technique. In some embodiments, this parameter controls the range around the potential change point that is used to perform the clustering. In some embodiments, the size of the time segments may also be configured.

As shown, the configuration interface may allow the user to configure a change point detection metric, here a metric named "DIFF1." For example, the user may click the EDIT METRIC button 744 to display another user interface or view to change how the dissimilarity metric or refresh strength signal is determined. As shown, the user interface may allow the user to adjust the change point detection threshold. In this example, the threshold is a manually set value. In some embodiments, the threshold may be determined based on a function whose control parameters are configurable via the configuration user interface.

FIGS. 8A and 8B illustrate example user interfaces to configure different aspects of a change point detection system to trigger model updates, according to some embodiments. These user interfaces may be implemented as part of the configuration 142, as discussed in connection with FIG. 1.

FIG. 8A depicts a user interface 800 that can be used to combine multiple change point detection methods to detect change points in the time series data. As shown, the user interface 800 allows a user to select different ones of three different methods, including a residual-based method, a clustering-based method, and a volatility-based method. In this example, the first two methods are used, and they are combined using respective weights into an overall change point indicator. For example, the residual-based method may be used to generate a first indicator, and the clustering-based method may be used to generate a second indicator, and the two indicators may be combined in a linear combination based on the configured weights. Different embodiments may allow the methods to be combined in different fashion. In some embodiments, a first method may be used as a first pass to identify possible change points, and a second method may be used to corroborate the choices of the first method. In some embodiments, multiple methods may be used to cast votes to arrive at the ultimate determination for a point. In some embodiments, a change point detection condition may be a compound condition that depends on satisfying multiple methods under multiple thresholds.

As shown, in some embodiments, the user interface 800 may allow the user to add methods for detecting change points in the time series data. In this example, an ADD button 810 is provided, which may be clicked to display a user interface to perform this functionality. In some embodiments, a user may be able to provide a code module or executable that may be invoked via the change point detection system. In some embodiments, the supplied code module or executable may implement a particular invocation interface specified by the change point detection system, so as to provide a signal or indication of whether a particular point is a change point. For example, in some embodiments, the change point detection may itself be performed via a machine learning model, which was trained to detect custom change points in the time series data.

FIG. 8B depicts a user interface 830, which may be used to configure responsive actions performed by the change point detection system upon the detection of a change point. In this example, multiple responsive actions may be performed.

As shown, the change point detection system may be configured to notify a client when change points are detected. In some embodiments, the client may be an owner of the machine learning model. In some embodiments, the configuration interface 830 may provide an interface (e.g. via the CONFIGURE button 840) to configure how the notification is performed. Depending on the embodiment, the notification may be displayed on an interactive user interface, used to generate a programmatic call, pushed via a message, email, or text, or logged to a log file or data store, among other possibilities.

As shown, the change point detection system may also be configured to take responsive action by changing the model that consumes the time series data. As shown, in some embodiments, the system may train the model with augmented data. This action may be configurable via button 850. In some embodiments, this action may be performed via a call or job submission to a machine learning service. In some embodiments, a change point detection may trigger a change to one or more parameters of the model. For example, in some embodiments, a model may expose one or more switches that allows portions of it to be switched on or off during execution. In some embodiments, as shown, the responsive action may involve switching to a different model. In some embodiments, when fundamental changes are detected in the time series data, a completely different model may be selected to handle the new data.

As discussed, in some embodiments, the change point detection system may be implemented as a multiuser service. Thus, each user may create different agents to monitor different sources of time series data, and in some embodiments, update their time-based models according to custom change point detection methods. In some embodiments, multiple time series data may be monitored to update a single model. In some embodiments, a single time series data may be used to update multiple models. In some embodiments, a user may specify different types of change points within a single time series data, which may be used to trigger different types of updates to the model.

Figure 9:
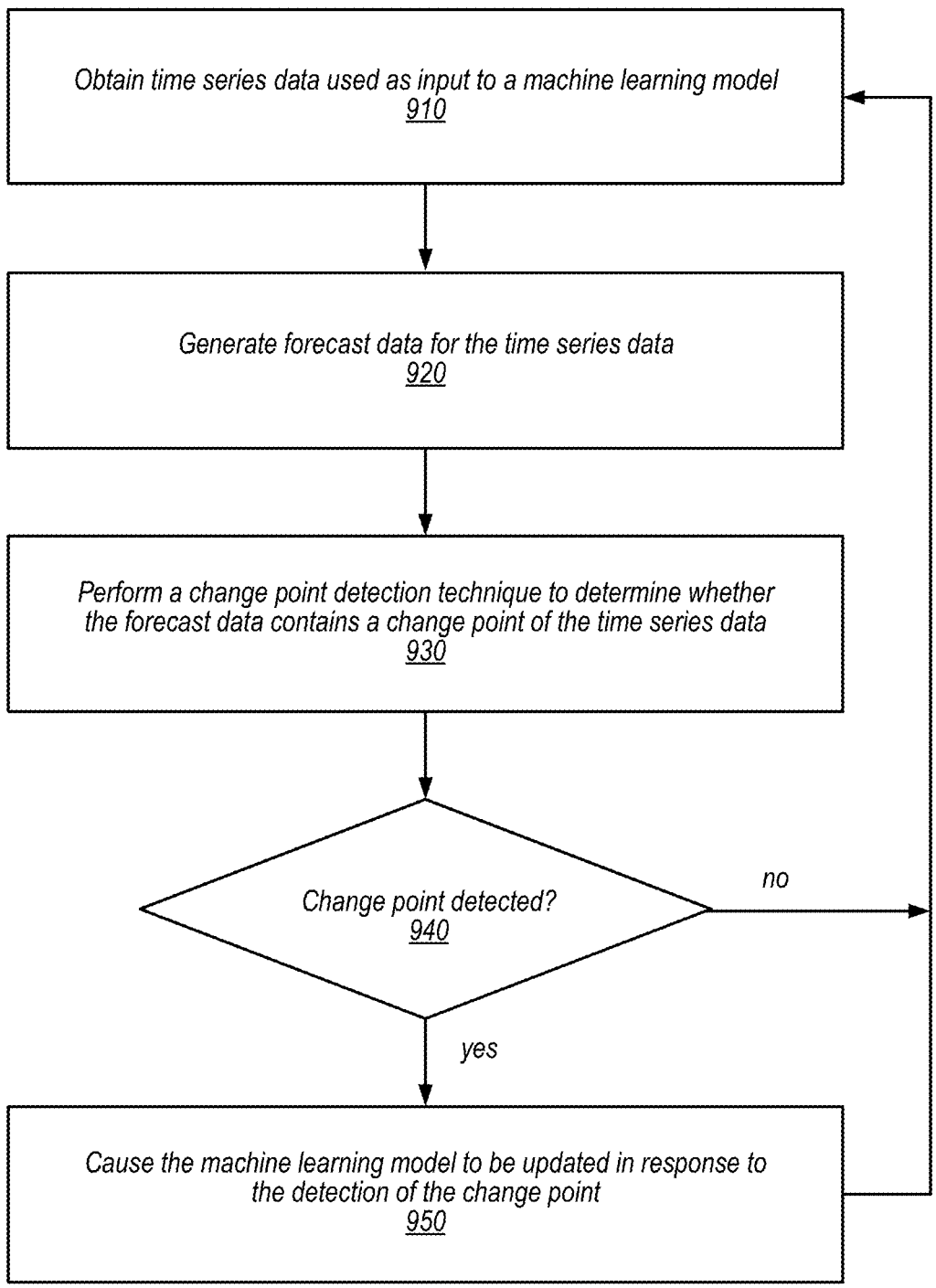
FIG. 9 is a flowchart illustrating a process of updating a machine learning model based on a detected change point in a time series data, according to some embodiments.

FIG. 9 is a flowchart illustrating a process of updating a machine learning model based on a detected change point in a time series data, according to some embodiments. The depicted process may be performed via a change point detection system 130, as discussed in connection with FIG. 1.

At operation 910, a time series data used as input to a machine learning model is obtained. In some embodiments, this time series data may be received via a data source that is continuously producing the time-series data. In some embodiments, the change point detection system may monitor or register to receive the time series data.

At operation 920, a forecast for the time series data is generated. This operation may be performed by for example the time data forecaster 132 of FIG. 1. In some embodiments, the forecasting may be performed using a forecasting service. In some embodiments, the forecasting may be performed using a recurrent neural network. The recurrent neural network may continuously generate forecasted time data from a continuous stream of observed time series data. In some embodiments, the forecasted data may be long enough to provide a horizon for change point detection.

At operation 930, a change point detection technique is performed to determine whether the forecast data contains a change point of the time series data. In some embodiments, operation 930 may be performed by for example the change point detector 136 of FIG. 1. The change point detection technique may employ a variety of different detection methods, for example, the residual metric ratio method as discussed in connection with FIG. 3, the time segment clustering method as discussed in connection with FIG. 5, or a combination of these or other methods. In some embodiments, the detection may determine not just one, but all perceived change points in the forecast data. In some embodiments, the change point detector may also provide a confidence indicator associated with each detected change point.

At operation 940, if a change point is not detected, the process proceeds back to operation 910 to repeat the process for more observed time series data. However, if a change point is detected, the process proceeds to operation 950.

At operation 950, the machine learning model is updated in response to the detection of the change point. In some embodiments, operation 950 may be performed by for example the model updater 136 of FIG. 1. In some embodiments, the model may be retrained or further trained. In some embodiments, the retraining may be based on augmented training data that is selected based on a similarity with the forecast data. In some embodiments, the machine learning model may be modified via parameter tuning. In some embodiments, a replacement or additional model may be selected in response to the detected change point. The process then proceeds back to operation 910 where it repeats for newly obtained time series data. In this manner, the change point detection system may continually or periodically examine the input data to the machine learning model, and make adjustments to the machine learning model accord to detected changes in the input data.

Figure 10:
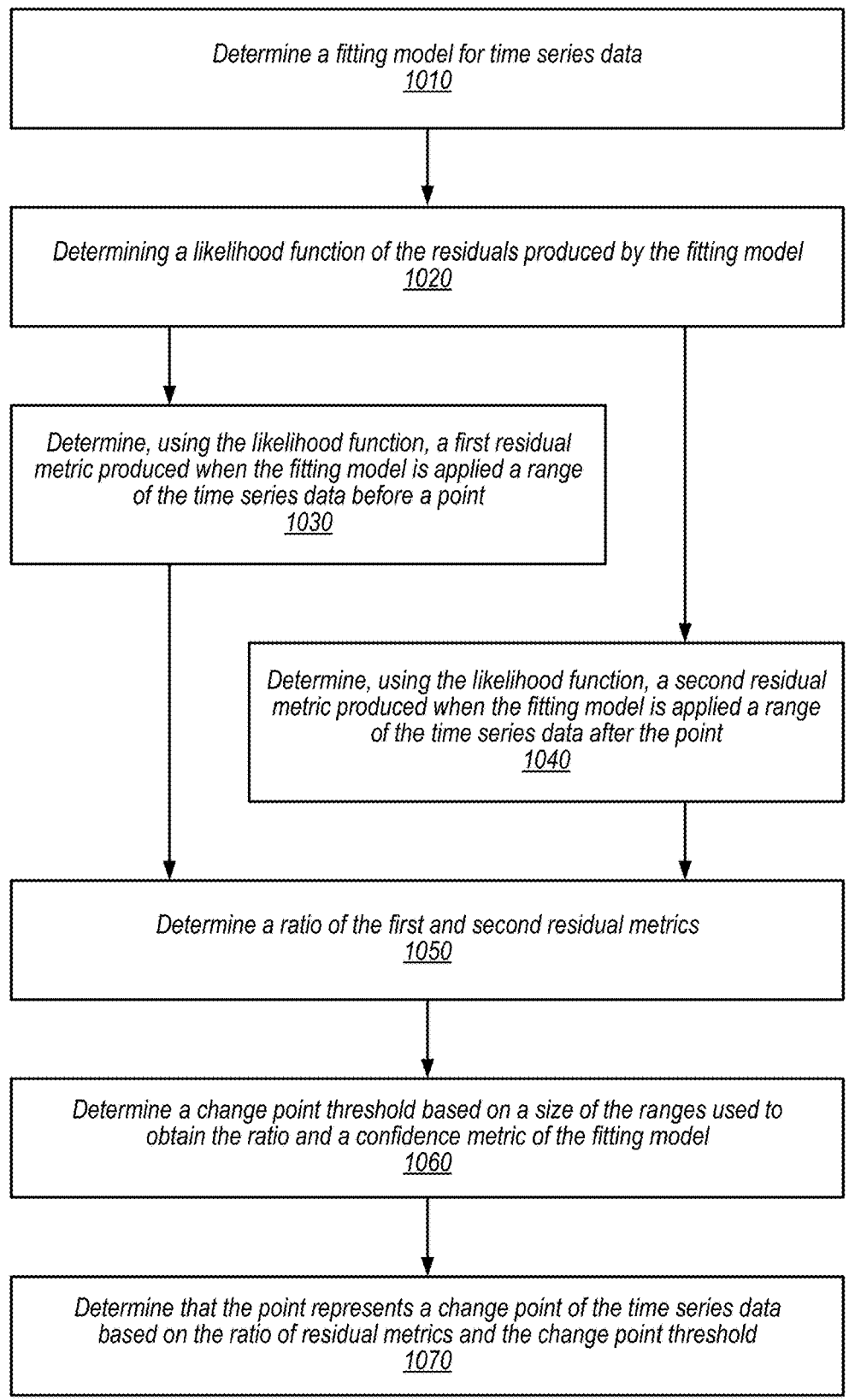
FIG. 10 is a flowchart illustrating a process of detecting a change point in time series data using a ratio of residual metrics generated by a fitting model, according to some embodiments.

FIG. 10 is a flowchart illustrating a process of detecting a change point in time series data using a ratio of residual metrics generated by a fitting model, according to some embodiments. The process of FIG. 10 may be performed via a change point detection system 130, as discussed in connection with FIG. 1.

At operation 1010, a fitting model for a time series data is determined. In some embodiments, the fitting model may represent a modeled component that models the time series data, which is derived via a decomposition technique. In some embodiments, the fitting model may be determined so that it minimizes or reduces the residuals generated when the model is applied to the time series data.

At operation 1020, a likelihood function of the residuals produced by the fitting model is determined. In some embodiments, the determination may assume that the fitting model will produce residuals that are distributed according to a Gaussian distribution. In some embodiments, other distribution functions may be used. In some embodiments, the parameters of the distributions (and the likelihood function) may be derived from the time series data. In some embodiments, the likelihood function may be function 340 discussed in connection with FIG. 3.

At operations 1030 and 1040, respective residual metrics are determined for the fitting model for a range of time series data before a point and a range of time series data after a point. In some embodiments, the point may represent a point being evaluated as a potential change point in the data. In some embodiments, the point may occur in a forecast of the time series data. In some embodiments, the residual metrics may be the likelihoods 350 and 352 discussed in connection with FIG. 3.

At operation 1050, a ratio of the two residual metrics is determined. In some embodiments, the ratio may be the ratio 360, as discussed in connection with FIG. 3. In some embodiments, the ratio may indicate how a relatively dissimilarity in the data's apparent agreement with the fitting model. Thus, when the ratio changes drastically around a particular point, the point may represent a change point.

At operation 1060, a change point threshold is determined based on a size of ranges used to obtain the ratio of residual metrics and a confidence metric of the fitting model. As discussed, in some embodiments, the change point threshold is not a static value, but may be configurable, or even dynamically configurable via hyperparameters. In some embodiments, the change point threshold may be lower when a large range is used to determine the residual metric ratio. In some embodiments, the change point threshold may be higher when the fitting model is associated with a lower confidence.

At operation 1070, the ratio of residual metrics is compared against the change point threshold to determine whether the point represents a change point. As discussed, in some embodiments, the detection of a change point may cause a model that consumes the time series data to be updated.

Figure 11:
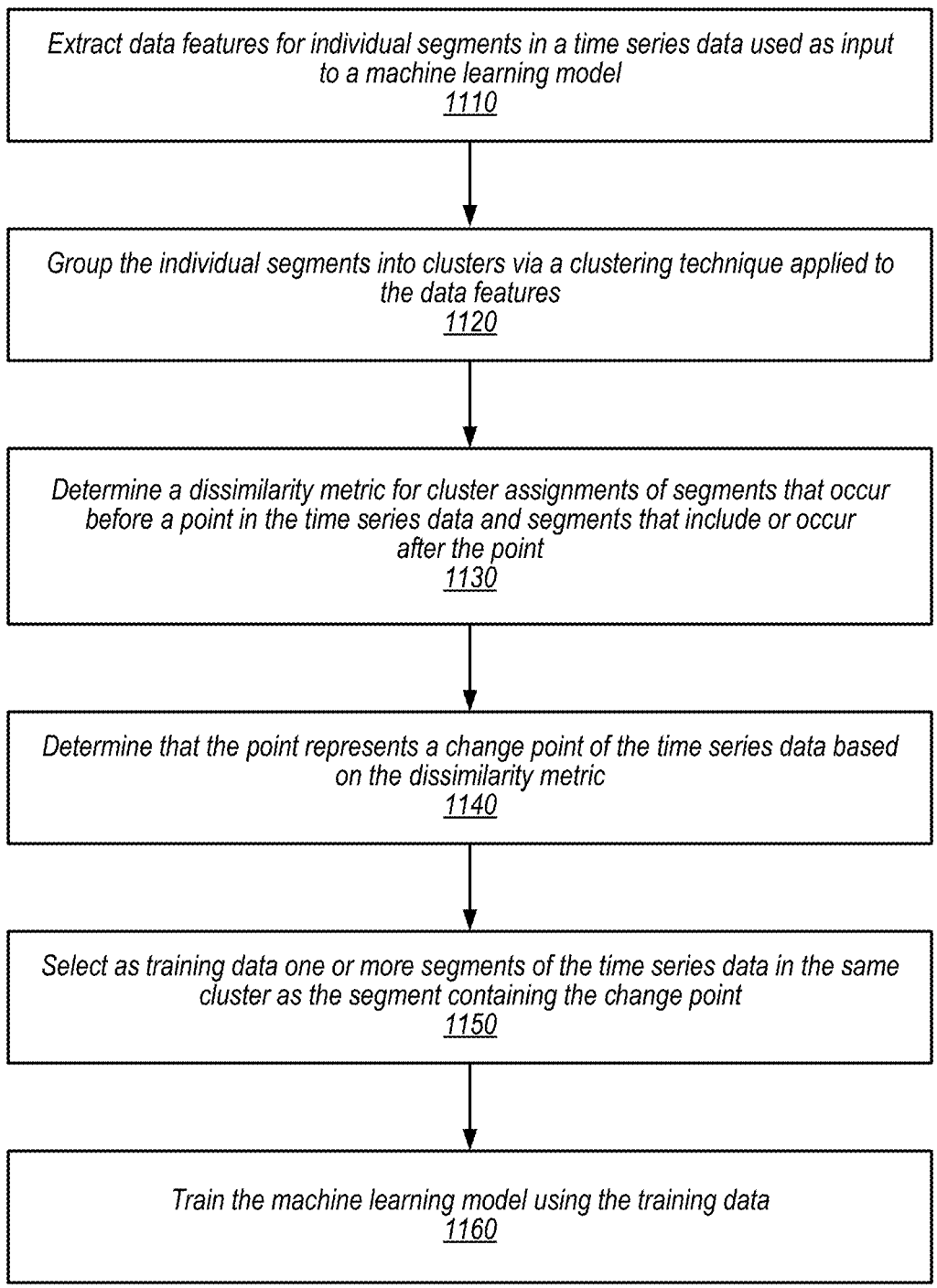
FIG. 11 is a flowchart illustrating a process of selecting augmented training data for a machine learning model from input time series data using a feature-based clustering technique, according to some embodiments.

FIG. 11 is a flowchart illustrating a process of selecting augmented training data for a machine learning model from input time series data using a feature-based clustering technique, according to some embodiments. The process of FIG. 10 may be performed via a change point detection system 130, as discussed in connection with FIG. 1.

At operation 1110, data features are obtained for individual segments in a time series data used as input data to a machine learning model. In some embodiments, the time series data may be divided into a series of segments, for example as shown in FIG. 5. In some embodiments, data features such as those shown in Table 1 may be extracted from each time segment. In some embodiments, the data features that are used in the process are selectable via a configuration interface.

At operation 1120, the individual segments are grouped into clusters via a clustering technique applied to the data features. In some embodiments, the clustering technique may be a technique discussed in connection with FIG. 5. In some embodiments, time segments that have similar characteristics or properties are assigned to the same cluster.

At operation 1130, a dissimilarity metric is determined. The dissimilarity metric may indicate a dissimilarity for cluster assignments of segments that occur before a point in the time series data and segments that include or occur after the point. In some embodiments, the dissimilarity metric may be the dissimilar metric discussed in connection with FIG. 5. In some embodiments, the dissimilarity metric may be based on a ratio of a distinct number of clusters that are common to the two different sets of time segments and the total distinct number of clusters.

At operation 1140, a determination is made that the point represents a change point in the time series data. The determination is made based on the dissimilarity metric. In some embodiments, the dissimilarity metric may be compared to a configurable threshold, so that if the metric exceeds or falls below the threshold, the change point is deemed to be a change point.

At operation 1150, one or more segments of time series data is selected from a cluster that is contains the segment of the change point. In some embodiments, the selected segments may be used as training data to augment the training of the machine learning model. In some embodiments, time segments that are assigned to the same cluster represent similar data in terms of data features or properties. Accordingly, segments that are in the same cluster as the change point segment may represent good training data for the machine learning model.

At operation 1160, the machine learning model is trained using the selected training data. In some embodiments, operation 1160 may be performed by model updater 138, as discussed in connection with FIG. 1. As discussed, in some embodiments, this operation may be performed via a machine learning service that can programmatically receive and execute machine learning jobs. In some embodiments, the training may be performed so that the model is updated before the predicted change point is encountered by the model.

Figure 12:
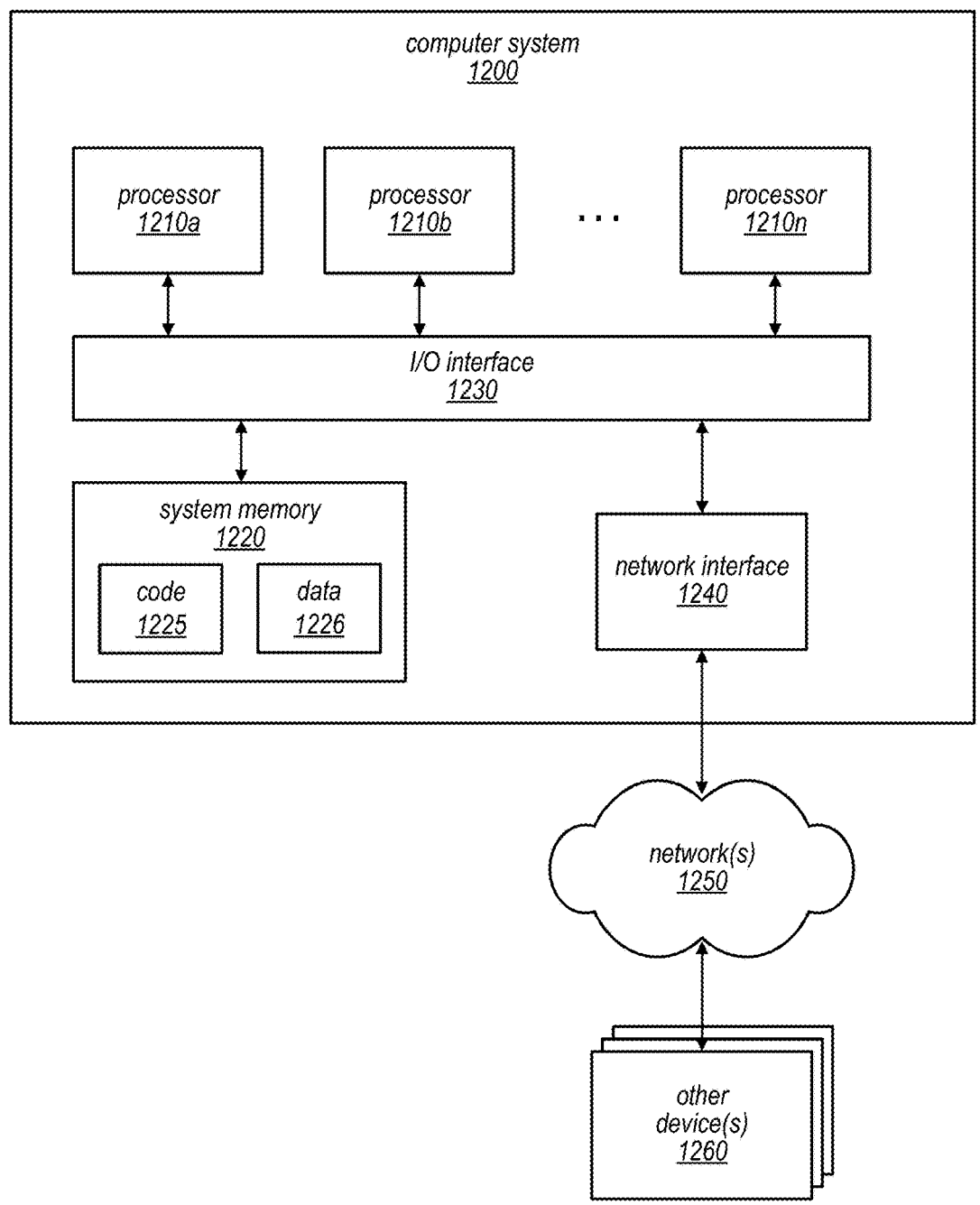
FIG. 12 is a block diagram illustrating an example computer system that can be used to implement a change point detection system to update a time-based model, according to some embodiments.

FIG. 12 is a block diagram illustrating an example computer system that can be used to implement a change point detection system to update a time-based model, according to some embodiments. Computer system 1200 may include or be configured to access one or more nonvolatile computer-accessible media. In the illustrated embodiment, computer system 1200 includes one or more processors 1210 coupled to a system memory 1220 via an input/output (I/O) interface 1230. Computer system 1200 further includes a network interface 1240 coupled to I/O interface 1230.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1220 as code 1225 and data 1226. The system memory 1220 may include different levels of cache, some of which may be located on the CPU and some away from the CPU. One level of the cache hierarchy may be a last level cache that is shared by all of the processors 1210a to 1210n. The last level cache may be an inclusive cache of the low levels of cache in the cache hierarchy.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices, such as routers and other computing devices, as illustrated in FIGS. 1 through 10, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIGS. 1 through 10 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Embodiments of the disclosure can be described in view of the following clauses:

Clause 1:

A system comprising:

one or more computers configured to implement a machine learning model that generates output from time series data;

one or more other computers configured to implement a change point detection service, configured to:
    generate future data for the time series data via a forecasting technique;
    determine a fitting model for the time series data;
    determine, for a point in the future data forecasted, a ratio of respective residual metrics when the fitting model is applied to time series data before the point versus when the fitting model is applied to the future data after the point;
    determine that the point represents a change point of the time series data based at least in part on the ratio of respective residual metrics; and
    cause the machine learning model to be updated automatically based at least in part on the determination of the change point.

Clause 2:
The system of clause 1, wherein the change point detection service is configured to:
    determine a likelihood function of the residuals produced by the fitting model; and
    determine the respective residual metrics via the likelihood function.

Clause 3:
The system of clauses 1 to 2, wherein the ratio of respective residual metrics is determined using a range of the time series data around the point, and to determine that the point represents a change point, the change point detection service is configured to:
    determine a change point threshold based at least in part on a size of the range used to determine the ratio; and
    determine that the ratio exceeds the change point threshold.

Clause 4:
The system of clause 3, wherein the change point detection service includes a configuration interface that enables configuration of one or more of:
    one or more parameters for the determination of the fitting model, one or more parameters for the determination of the ratio of respective residual metrics, or one or more parameters for the determination of the change point threshold.

Clause 5:
The system of clauses 1 to 4, wherein the change point detection service is configured to:
    extract data features for individual segments of the time series data including the future data;
    group the individual segments into a plurality of clusters via a clustering technique applied to the data features; and
    wherein the determination that the point represents a change point is based at least in part on the plurality of clusters.

Clause 6:
A method comprising:
    forecasting future data for a time series data, wherein the time series data is used by a machine learning model to generate output;
    determining a fitting model for the time series data;
    determining, for a point in the future data forecasted, a ratio of respective residual metrics when the fitting model is applied to time series data before the point versus when the fitting model is applied to the future data after the point;
    determining that the point represents a change point of the time series data based at least in part on the ratio of respective residual metrics; and
    causing an automatic update of the machine learning model based at least in part on the determination that the point represents a change point.

Clause 7:
The method of clause 6, further comprising:
    determining a likelihood function of the residuals produced by the fitting model; and
    determining the respective residual metrics via the likelihood function.

Clause 8:
The method of clauses 6 to 7, wherein:
    the ratio of respective residual metrics is determined using a range of the time series data around the point, and
    determining that the point represents a change point comprises:
        determining a change point threshold based at least in part on a size of the range used to determine the ratio; and
        determining that the ratio exceeds the change point threshold.

Clause 9:
The method of clause 8, where the determination the change point threshold is based at least in part on a confidence metric of the fitting model.

Clause 10:
The method of clause 8, further comprising:
    receiving configuration input via a configuration interface specifying one or more of:
        one or more parameters for the determination of the fitting model,
        one or more parameters for the determination of the ratio of respective residual metrics, or
        one or more parameters for the determination of the change point threshold.

Clause 11:
The method of clauses 6 to 10, wherein the determining of the point as a change point and the causing of the update of the machine learning model are performed via a change point detection service, and further comprising performing, by the change point detection service:
    determining respective change points in respective time series data for a plurality of machine learning models; and
    causing respective updates to the plurality of machine learning models responsive to the determinations of the respective change points.

Clause 12:
The method of clauses 6 to 11, further comprising:
    extracting data features for individual segments of the time series data including the future data;
    grouping the individual segments into a plurality of clusters via a clustering technique applied to the data features; and
    wherein the determination that the point represents a change point is based at least in part on the plurality of clusters.

Clause 13:
The method of clause 12, wherein causing the machine learning model to be updated comprises causing the machine learning model to be trained using data for one or more segments of the time series data that are grouped in a same cluster as a segment containing the change point.

Clause 14:
A non-transitory computer-accessible storage medium storing program instructions that when executed on one or more processors cause the one or more processors to:

generate future data for a time series data via a forecasting technique, wherein the time series data is used by a machine learning model to generate output;
determine a fitting model for the time series data;
determine, for a point in the future data forecasted, a ratio of respective residual metrics when the fitting model is applied to time series data before the point versus when the fitting model is applied to the future data after the point;
determine that the point represents a change point of the time series data based at least in part on the ratio of respective residual metrics; and
cause the machine learning model to be updated automatically based at least in part on the determination of the change point.

Clause 15:
The non-transitory computer-accessible storage medium of clause 14, wherein the program instructions when executed on the one or more processors cause the one or more processors to:
determine a likelihood function of the residuals produced by the fitting model; and
determine the respective residual metrics via the likelihood function.

Clause 16:
The non-transitory computer-accessible storage medium of clauses 14 to 15, wherein the ratio of respective residual metrics is determined using a range of the time series data around the point, and to determine that the point represents a change point, the program instructions when executed on the one or more processors cause the one or more processors to:
determine a change point threshold based at least in part on a size of the range used to determine the ratio; and
determine that the ratio exceeds the change point threshold.

Clause 17:
The non-transitory computer-accessible storage medium of clause 16, wherein the program instructions when executed on the one or more processors cause the one or more processors to determine the change point threshold based at least in part on a confidence metric of the fitting model.

Clause 18:
The non-transitory computer-accessible storage medium of clauses 16 to 17, wherein the program instructions when executed on the one or more processors cause the one or more processors to:
receive configuration input via a configuration interface specifying one or more of:
one or more parameters for the determination of the fitting model,
one or more parameters for the determination of the ratio of respective residual metrics, or
one or more parameters for the determination of the change point threshold.

Clause 19:
The non-transitory computer-accessible storage medium of clauses 14 to 18, wherein the program instructions when executed on the one or more processors cause the one or more processors to:
extract data features for individual segments of the time series data including the future data;
group the individual segments into a plurality of clusters via a clustering technique applied to the data features; and
wherein the determination that the point represents a change point is based at least in part on the plurality of clusters.

Clause 20:
The non-transitory computer-accessible storage medium of clause 19, wherein to cause the machine learning model to be updated, the program instructions when executed on the one or more processors cause the machine learning model to be trained using data for one or more segments of the time series data that are grouped in a same cluster as a segment that contains the change point.

Clause 21:
A system comprising:
one or more computers configured to implement a machine learning model that generates output from time series data;
one or more other computers configured to implement a change point detection service, configured to:
generate future data for the time series data via a forecasting technique;
extract data features for individual segments in the time series data including the future data;
group the individual segments into a plurality of clusters via a clustering technique applied to the data features;
determine that a point in a future segment of the future data represents a change point of the time series data based at least in part on the plurality of clusters; and
cause the machine learning model to be updated automatically based at least in part on the determination of the change point.

Clause 22:
The system of clause 21, wherein to determine the change point, the change point detection service is configured to:
determine a dissimilarity metric for cluster assignments of segments that occur before the point and cluster assignments of segments that include or occur after the point; and
determine that the dissimilarity metric exceeds a threshold.

Clause 23:
The system of clauses 21 to 22, wherein to cause the machine learning model to be updated, the change point detection service causes the machine learning model to be trained using data for one or more segments of the time series data that are grouped in a same cluster as the future segment.

Clause 24:
The system of clauses 21 to 23, wherein the change point detection service includes a configuration interface that enables configuration of one or more of:
the data features to use for the clustering technique, or
one or more parameters for the updating of the machine learning model.

Clause 25:
The system of clauses 21 to 24, wherein the change point detection service is configured to:
determine a fitting model for the time series data;
determine, for the point, a ratio of respective residual metrics when the fitting model is applied to time series data before the point versus when the fitting model is applied to the future data after the point; and
wherein the determination of the change point is based at least in part on the ratio of respective residual metrics.

Clause 26:

A method comprising:
  forecasting future data for a time series data, wherein the time series data is used by a machine learning model to generate output;
  extracting data features for individual segments in the time series data including the future data;
  grouping the individual segments into a plurality of clusters via a clustering technique applied to the data features;
  determining that a point in a future segment of the future data represents a change point of the time series data based at least in part on the plurality of clusters; and
  causing an automatic update of the machine learning model based at least in part on the determination that the point represents a change point.

Clause 27:

The method of clause 26, wherein determining the change point comprises:
  determining a dissimilarity metric for cluster assignments of segments that occur before the point and cluster assignments of segments that include or occur after the point; and
  determining that the dissimilarity metric exceeds a threshold.

Clause 28:

The method of clauses 26 to 27, wherein causing the machine learning model to be updated comprises causing the machine learning model to be trained using data for one or more segments of the time series data that are grouped in a same cluster as the future segment.

Clause 29:

The method of clauses 26 to 28, further comprising:
  receiving configuration input via a configuration interface specifying one or more of:
    the data features to use for the clustering technique, or
    one or more parameters for the updating of the machine learning model.

Clause 30:

The method of clauses 26 to 29, where extracting the data features comprises extracting one or more of: a mean, a variance, an indication of peak, or an indication of trough from the individual segments.

Clause 31:

The method of clauses 26 to 30, wherein the determining of the point as a change point and the causing of the update of the machine learning model are performed via a change point detection service, and further comprising performing, by the change point detection service:
  determining respective change points in respective time series data for a plurality of machine learning models; and
  causing respective updates to the plurality of machine learning models responsive to the determinations of the respective change points.

Clause 32:

The method of clauses 26 to 31, further comprising:
determining a fitting model for the time series data;
determining, for the point, a ratio of respective residual metrics when the fitting model is applied to time series data before the point versus when the fitting model is applied to the future data after the point; and
wherein the determination of the change point is based at least in part on the ratio of respective residual metrics.

Clause 33:

The method of clause 32, wherein the determination that the point represents a change point is based at least in part on a weighted average of a first indicator generated using the plurality of clusters and a second indicator generated using the ratio of respective residual metrics.

Clause 34:

A non-transitory computer-accessible storage medium storing program instructions that when executed on one or more processors cause the one or more processors to:
  generate future data for a time series data via a forecasting technique, wherein the time series data is used by a machine learning model to generate output;
  extract data features for individual segments in the time series data including the future data;
  group the individual segments into a plurality of clusters via a clustering technique applied to the data features;
  determine that a point in a future segment of the future data represents a change point of the time series data based at least in part on the plurality of clusters; and
  cause the machine learning model to be updated automatically based at least in part on the determination of the change point.

Clause 35:

The non-transitory computer-accessible storage medium of clause 34, wherein to determine the change point, the program instructions when executed on the one or more processors cause the one or more processors to:
  determine a dissimilarity metric for cluster assignments of segments that occur before the point and cluster assignments of segments that include or occur after the point; and
  determine that the dissimilarity metric exceeds a threshold.

Clause 36:

The non-transitory computer-accessible storage medium of clauses 34 to 35, wherein to cause the machine learning model to be updated, the program instructions when executed on the one or more processors cause the machine learning model to be trained using data for one or more segments of the time series data that are grouped in a same cluster as the future segment.

Clause 37:

The non-transitory computer-accessible storage medium of clauses 34 to 36, wherein to cause the machine learning model to be updated, the program instructions when executed on the one or more processors cause the one or more processors to replace the machine learning model with a new machine learning model, wherein the new model is selected based at least in part on a cluster assignment of the future segment.

Clause 38:

The non-transitory computer-accessible storage medium of clauses 34 to 37, wherein the program instructions when executed on the one or more processors cause the one or more processors to:
  receive configuration data via a configuration interface specifying one or more of:
    the data features to use for the clustering technique, or
    one or more parameters for the updating of the machine learning model.

Clause 39:

The non-transitory computer-accessible storage medium of clauses 34 to 38, wherein to extract the data features from the individual segments, the program instructions when executed on the one or more processors cause the one or more processors to extract one or more of: a mean, a variance, an indication of peak, or an indication of trough from the individual segments.

Clause 40:

The non-transitory computer-accessible storage medium of clauses 34 to 39, wherein the program instructions when executed on the one or more processors cause the one or more processors to:

determine a fitting model for the time series data;

determine, for the point, a ratio of respective residual metrics when the fitting model is applied to time series data before the point versus when the fitting model is applied to the future data after the point; and wherein the determination of the change point is based at least in part on the ratio of respective residual metrics.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

one or more computers configured to implement a first machine learning model that consumes a time series data to generate output;

one or more other computers configured to implement a change point detection service, configured to:

monitor the time series data using a second machine learning model to generate, via a forecasting technique implemented by the second machine learning model, future data for the time series data consumed by the first machine learning model;

group the time series data and the future data into a plurality of segments, including one or more future segments that contain at least some of the future data;

extract data features of individual ones of the segments;

group the segments into a plurality of clusters via a clustering technique applied to the data features;

determine a dissimilarity metric that quantifies a dissimilarity between a first cluster assignment distribution of segments before the point and a second cluster assignment distribution of segments that include or occur after the point; and determine that a point in a future segment represents a future change point of the time series data based at least in part on the dissimilarity metric exceeding a threshold; and wherein the first machine learning model is updated by a model updater in response to the determination of the future change point of the time series data to adapt the first machine learning model to a changing condition of the time series data at the future change point.

2. The system of claim 1, wherein the dissimilarity metric comprises a ratio of (a) common clusters in the first and second cluster assignment distributions and (b) all clusters in the first and second cluster assignment distributions.

3. The system of claim 1, wherein to update the first machine learning model, the model updater causes the first machine learning model to be trained using data for one or more segments of the time series data that are grouped in a same cluster as the future segment.

4. The system of claim 1, wherein the change point detection service includes a configuration interface that enables configuration of one or more of:

the data features to use for the clustering technique, or one or more parameters for the updating of the first machine learning model.

5. The system of claim 1, wherein the change point detection service is configured to:

determine a fitting model for the time series data;

determine, for the point, a ratio of respective residual metrics when the fitting model is applied to time series data before the point versus when the fitting model is applied to the future data after the point; and wherein the determination of the future change point is based at least in part on the ratio of respective residual metrics.

6. A method, comprising:

monitoring a time series data consumed by a first machine learning model, wherein the monitoring includes generating future data for the time series data via a forecasting technique implemented by a second machine learning model;

grouping the time series data and the future data into a plurality of segments, including one or more future segments that contain at least some of the future data;

extracting data features of individual ones of the segments;

grouping the segments into a plurality of clusters via a clustering technique applied to the data features;

determining a dissimilarity metric that quantifies a dissimilarity between a first cluster assignment distribution of segments before the point and a second cluster assignment distribution of segments that include or occur after the point;

determining that a point in a future segment represents a future change point of the time series data based at least in part on the dissimilarity metric exceeding a threshold; and in response to the determination that the point represents a future change point, updating the first machine learning model to adapt the first machine learning model to a changing condition of the time series data at the future change point.

7. The method of claim 6, wherein the dissimilarity metric comprises a ratio of (a) common clusters in the first and second cluster assignment distributions and (b) all clusters in the first and second cluster assignment distributions.

8. The method of claim 6, wherein updating the first machine learning model comprises causing the first machine learning model to be trained using data for one or more segments of the time series data that are grouped in a same cluster as the future segment.

9. The method of claim 6, further comprising:
receiving configuration input via a configuration interface selecting a combination of multiple change point detection methods to use to detect the future change point, the multiple change point detection methods including two or more of a clustering-based method, a residual-based method, and a volatility-based method.

10. The method of claim 6, where extracting the data features comprises extracting one or more of: a mean, a variance, an indication of peak, or an indication of trough from the individual segments.

11. The method of claim 6, wherein the determining of the point as a future change point is performed via a change point detection service, and further comprising performing, by the change point detection service:
determining respective future change points in respective time series data for a plurality of machine learning models; and
causing the plurality of machine learning models to be updated via a model updater service responsive to the determinations of the respective future change points.

12. The method of claim 6, wherein the second machine learning model comprises a recurrent neural network.

13. The method of claim 12, wherein the determination that the point represents a future change point is based at least in part on a weighted average of a first indicator generated using the plurality of clusters and a second indicator generated using the ratio of respective residual metrics.

14. A non-transitory computer-accessible storage medium storing program instructions that when executed on one or more processors cause the one or more processors to:
monitor a time series data consumed by a first machine learning model to generate future data for a time series data via a forecasting technique implemented by a second machine learning model;
group the time series data and the future data into a plurality of segments, including one or more future segments that contain at least some of the future data;
extract data features of individual ones of the segments;
group the segments into a plurality of clusters via a clustering technique applied to the data features;
determine a dissimilarity metric that quantifies a dissimilarity between a first cluster assignment distribution of segments before the point and a second cluster assignment distribution of segments that include or occur after the point;
determine that a point in a future segment represents a future change point of the time series data based at least in part on the dissimilarity metric exceeding a threshold; and
in response to the determination of the future change point of the time series data, update the first machine learning model to adapt the first machine learning model to a changing condition of the time series data at the future change point.

15. The non-transitory computer-accessible storage medium of claim 14, wherein the dissimilarity metric comprises a ratio of (a) common clusters in the first and second cluster assignment distributions and (b) all clusters in the first and second cluster assignment distributions.

16. The non-transitory computer-accessible storage medium of claim 14, wherein to update the first machine learning model, the program instructions when executed on the one or more processors cause the first machine learning model to be trained using data for one or more segments of the time series data that are grouped in a same cluster as the future segment.

17. The non-transitory computer-accessible storage medium of claim 14, wherein to update the first machine learning model, the program instructions when executed on the one or more processors cause the one or more processors to replace the first machine learning model with a new machine learning model, wherein the new machine learning model is selected based at least in part on a cluster assignment of the future segment.

18. The non-transitory computer-accessible storage medium of claim 14, wherein the program instructions when executed on the one or more processors cause the one or more processors to:
receive configuration data via a configuration interface specifying one or more of:
the data features to use for the clustering technique, or
one or more parameters for the updating of the first machine learning model.

19. The non-transitory computer-accessible storage medium of claim 14, wherein to extract the data features from the individual segments, the program instructions when executed on the one or more processors cause the one or more processors to extract one or more of: a mean, a variance, an indication of peak, or an indication of trough from the individual segments.

20. The non-transitory computer-accessible storage medium of claim 14, wherein the program instructions when executed on the one or more processors cause the one or more processors to:
determine a fitting model for the time series data;
determine, for the point, a ratio of respective residual metrics when the fitting model is applied to time series data before the point versus when the fitting model is applied to the future data after the point; and
wherein the determination of the future change point is based at least in part on the ratio of respective residual metrics.

\* \* \* \* \*